United States Patent
Koren et al.

(10) Patent No.: US 8,249,102 B2
(45) Date of Patent: Aug. 21, 2012

(54) METHOD AND APPARATUS FOR SESSION LAYER FRAMING TO ENABLE INTEROPERABILITY BETWEEN PACKET-SWITCHED SYSTEMS

(75) Inventors: Eitan Koren, Hertzelia (IL); Itamar Aharonson, Reshon Letzion (IL); Nissim Farhuma, Tel Aviv-Yaffo (IL); Abraham Tooba, Reshon Letzion (IL)

(73) Assignee: Motorola Solutions, Inc., Schaumburg, IL (US)

( * ) Notice: Subject to any disclaimer, the term of this patent is extended or adjusted under 35 U.S.C. 154(b) by 2262 days.

(21) Appl. No.: 10/899,714

(22) Filed: Jul. 27, 2004

(65) Prior Publication Data
US 2006/0023747 A1 Feb. 2, 2006

(51) Int. Cl.
*H04J 3/16* (2006.01)
(52) U.S. Cl. .................................. 370/469; 370/466
(58) Field of Classification Search .................. 370/347, 370/335, 390, 342, 241, 469, 401, 310, 466, 370/474, 60, 285; 709/203, 230, 227, 219; 455/456, 414.2; 375/219, 130; 341/24
See application file for complete search history.

(56) References Cited

U.S. PATENT DOCUMENTS

| | | | | |
|---|---|---|---|---|
| 4,679,189 A * | 7/1987 | Olson et al. | | 370/396 |
| 6,301,286 B1 * | 10/2001 | Kanterakis et al. | | 375/130 |
| 6,567,016 B1 * | 5/2003 | Rajamani et al. | | 341/24 |
| 6,985,935 B1 * | 1/2006 | Zhang et al. | | 709/219 |
| 6,996,076 B1 * | 2/2006 | Forbes et al. | | 370/310 |
| 7,154,875 B2 * | 12/2006 | Masui et al. | | 370/342 |
| 2001/0039589 A1 * | 11/2001 | Aho et al. | | 709/230 |
| 2002/0046280 A1 * | 4/2002 | Fujita | | 709/227 |
| 2002/0101913 A1 * | 8/2002 | Masters et al. | | 375/219 |
| 2002/0176439 A1 * | 11/2002 | Demerville et al. | | 370/444 |
| 2003/0133494 A1 * | 7/2003 | Bender et al. | | 375/130 |
| 2003/0223381 A1 * | 12/2003 | Schroderus | | 370/285 |
| 2004/0008728 A1 * | 1/2004 | Lee | | 370/474 |
| 2004/0057405 A1 | 3/2004 | Black | | |
| 2004/0136344 A1 * | 7/2004 | Kim et al. | | 370/335 |
| 2004/0171400 A1 | 9/2004 | Rosen et al. | | |
| 2004/0196826 A1 | 10/2004 | Bao et al. | | |
| 2005/0003831 A1 * | 1/2005 | Anderson | | 455/456.1 |
| 2005/0014489 A1 * | 1/2005 | Zhigang | | 455/414.2 |
| 2005/0021607 A1 * | 1/2005 | Yokota | | 709/203 |
| 2005/0058078 A1 * | 3/2005 | Jung et al. | | 370/241 |
| 2005/0117605 A1 * | 6/2005 | Yan et al. | | 370/469 |
| 2005/0122922 A1 | 6/2005 | Wu et al. | | |
| 2005/0141511 A1 | 6/2005 | Gopal | | |
| 2005/0232241 A1 | 10/2005 | Wu et al. | | |

(Continued)

OTHER PUBLICATIONS

Open Mobile Alliance, Wireless Aession Protocol 1.0, Sep. 20, 2002, Candidate version 1.0, 131 pages.*

(Continued)

*Primary Examiner* — Andrew Lai
*Assistant Examiner* — Syed M Bokhari
(74) *Attorney, Agent, or Firm* — Valerie M. Davis; Kenneth Haas

(57) ABSTRACT

A method and apparatus for session layer framing for interoperability between packet-switched systems is described. The method includes the steps of: generating (1210) a communication frame at the session layer including a plurality of fields; providing (1220) for a payload field in the plurality of fields for carrying a payload; and providing (1230) for a signal field in the plurality of fields for carrying a control signal.

20 Claims, 21 Drawing Sheets

U.S. PATENT DOCUMENTS

2006/0007930 A1* 1/2006 Dorenbosch ............... 370/390
2007/0291756 A1 12/2007 Akhtar et al.
2010/0208634 A1* 8/2010 Eng et al. ............... 370/310

OTHER PUBLICATIONS

Schulzrinne, et al., RFC 3550—RTP: A Transport Protocol for Real-Time Applications, Internet RFC/STD/FYI/BCP Archives, Jul. 2003.
WAVE Scalable Instant Communications, Twisted Pair Solutions.
WAVE: Application White Paper, Twisted Pair Solutions.
WAVE Data Sheet, Twisted Pair Solutions, 2003.
WAVE Solution Brief Interoperability, Twisted Pair Solutions, 2003.
NetworkFirst, Network Solution.
NetworkFirst Interoperability Solved, Tyco Electronics.
OpenSky NetworkFirst P25, Centralized Network Manager, Tyco Electtronics.
OpenSky NetworkFirst P25, Regional Network Manager, Tyco Electronics.
OpenSky NetworkFirst P25, Network Administration System, Tyco Electtronics.
OpenSky NetworkFirst P25, Network Switching Center, Tyco Electtronics.
OpenSky NetworkFirst P25, Network Switching Server, Tyco Electtronics.
OpenSky NetworkFirst P25, Interoperability Gateway, Tyco Electtronics.
OpenSky NetworkFirst P25, EDACS IP Gateway, Tyco Electtronics.
Non Final Office Action mailed on Jun. 24, 2011 in related U.S. Appl. No. 10/899,875, Eitan Korean, filed Jul. 27, 2004.
Non Final Office Action mailed on Jun. 24, 2010 in related U.S. Appl. No. 10/899,875, Eitan Korean, filed Jul. 27, 2004.
Final Office Action mailed on Apr. 21. 2009 in related U.S. Appl. No. 10/899,875, Eitan Korean, filed Jul. 27, 2004.
Non Final Office Action mailed on Jul. 2, 2008 in related U.S. Appl. No. 10/899,875, Eitan Korean, filed Jul. 27, 2004.
"IP Specification," RFC 791, Sep. 1981.
Postel, J., "User Datagram Protocol," RFC 768, Aug. 28, 1980.
Schulzrinne et al., "RTP: A Transport Protocol for Real-Time Applications," RFC 1869, Jan. 1996.

* cited by examiner

000# METHOD AND APPARATUS FOR SESSION LAYER FRAMING TO ENABLE INTEROPERABILITY BETWEEN PACKET-SWITCHED SYSTEMS

RELATED APPLICATIONS

The present invention is related to the following U.S. applications commonly owned together with this application by Motorola Solutions, Inc. (formerly known as Motorola, Inc.): U.S patent application Ser. No. 10/899,875, filed Jul. 27, 2004, titled "Method and Apparatus for Enabling Interoperability Between Packet-Switched Systems."

FIELD OF THE INVENTION

The present invention relates generally to communication networks and more specifically to a method and apparatus for enabling communication between two or more distinct packet-switched systems.

BACKGROUND OF THE INVENTION

Interoperability between the communication systems of local, state and federal agencies became of paramount importance as a result of the terrorist attacks to the United States on Sep. 11, 2001. In response to these events, the U.S. Department of Homeland Security (DHS) was created to facilitate a national effort to prevent and respond to such acts of terrorism. A major component of the DHS' domestic preparedness initiatives is the ability of First Responders to an emergency situation (including those from local, state and federal agencies) to communicate during the crisis.

One difficulty in accomplishing interoperability between the communication systems of local, state and federal agencies results from the differences in these systems, which include, but are not limited to, differences in radio types, modes and operating frequencies. One way of addressing this difficulty in interoperability is to design a solution based upon any known similarities between the systems. One obvious similarity is that essentially all of the communication systems for local, state and federal agencies provide for a plain media interface (e.g., base-band analog audio, base-band analog video, plain data, etc.) and typically have access to packet-switched communication systems (or networks). A packet-switched network is defined herein as a network that serves as the medium through which messages may be transmitted between two endpoints or nodes (e.g., between a source and a destination), wherein the message is broken down into a set of units commonly referred to as "packets," and the packets are transferred across the network.

A commonly used packet-switched network is an Internet Protocol (IP) based network, wherein the message is packetized and routed over the network using the Internet Protocol. The Internet Protocol is an open standard network layer (Layer 3 of the Open Standard Interconnection (OSI) model) routing protocol defined in the Internet Engineering Task Force (IETF) Request for Comment (RFC) 791 and any subsequent corresponding RFC updates as recognized in the art. Since IP-based networks are the types of networks most prevalently used by local, state and federal agencies, existing interoperability solutions are, accordingly, IP-based. Such IP-based solutions are desirable mainly because they do not require a costly and, quite frankly, unrealistic replacement of equipment that would be necessary to conform the existing communication systems of all of the various agencies to the same type of radio system, equipment and standards.

Moreover, existing solutions are based upon a client-server networking approach, wherein a client system that wants to be interconnected with another client system must first communicate with a third-party application (i.e., a server) to facilitate the interoperability and resultant communication with the other client system. However, such client-server based solutions suffer from major shortcomings. For example, these solutions generate a single point of failure at the interoperability server site, such that if the server is not functioning properly, interoperability is severely inhibited if not rendered impossible. In addition, expansion of systems using these client-server based solutions may become costly. Generally, a single server in accordance with the interoperability solution will have a maximum capacity, and when that capacity is reached, additional servers will be required. This may significantly increase the cost of the solution, thereby possibly making it cost prohibitive for some government agencies, especially the smaller ones that typically have fewer resources that may be dedicated to such solutions.

Thus, there exists a need for a method and apparatus for interoperability between packet-switched systems such as, for instance, IP-based systems that does not require a client-server based approach but that also enables interoperability using a peer-to-peer networking structure. It is further desirable that the solution be capable of expansion with minimal cost.

BRIEF DESCRIPTION OF THE FIGURES

A preferred embodiment of the invention is now described, by way of example only, with reference to the accompanying figures in which.

DETAILED DESCRIPTION OF THE INVENTION

Figure 1:
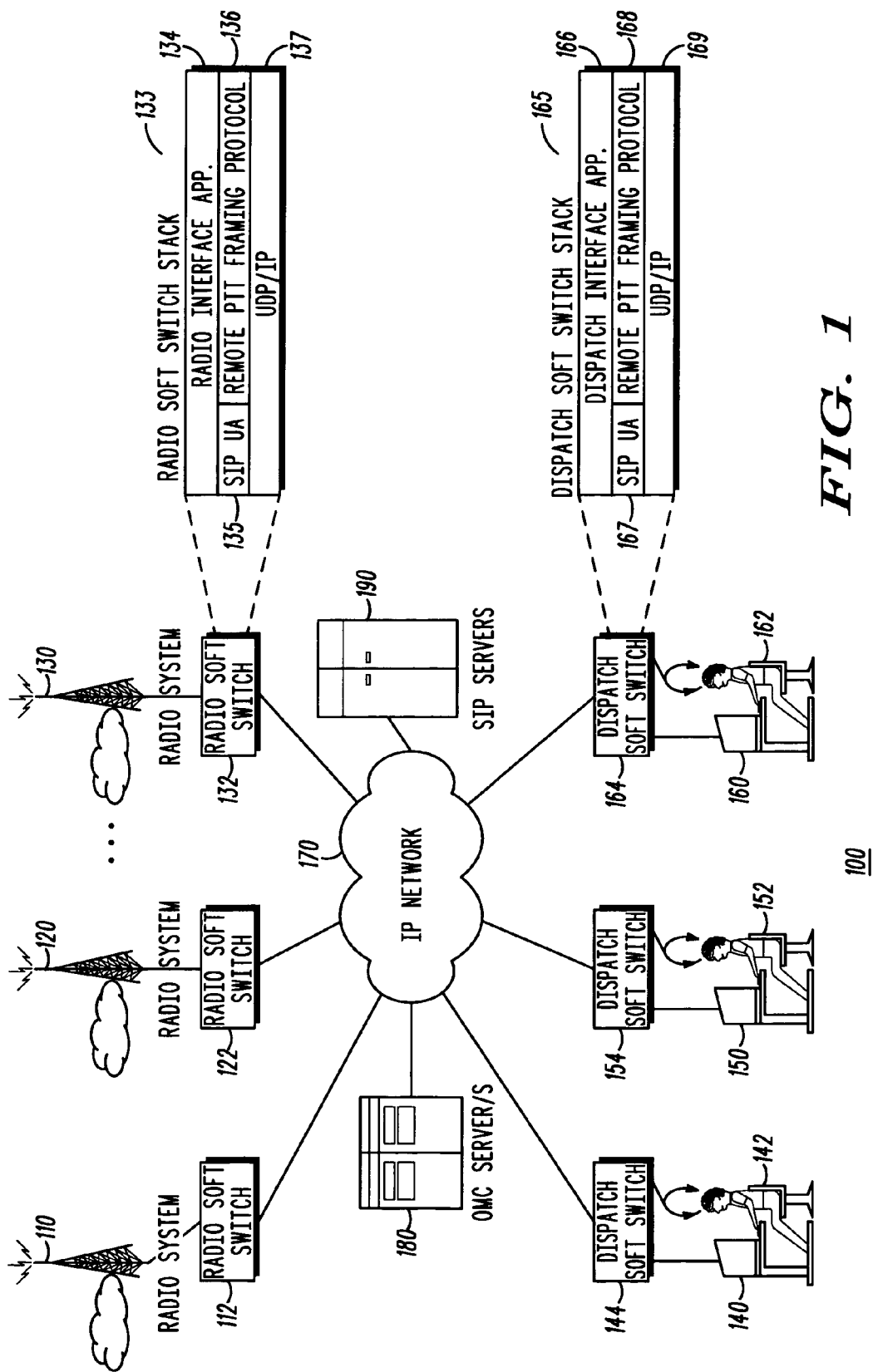
FIG. 1 illustrates a diagram of a system that is formed by interconnecting a plurality of packet-switched apparatus in accordance with an embodiment of the present invention.

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate corresponding elements.

Disclosed herein are various embodiments of the present invention that address the need for communication system interoperability, thereby enabling public-safety first responders and dispatchers from different agencies (police, fire, EMC, etc.) to be interconnected, for instance, at the time of a crisis or, if necessary, for daily routine. Accordingly, FIG. 1 illustrates a system 100 that is formed by interconnecting a plurality of packet-switched apparatus in accordance with the present invention. System 100 includes a plurality of exemplary packet-switched apparatus (illustrated as radio apparatus (or systems) 110, 120 and 130 and dispatcher apparatus 140, 150 and 160). Typically, some of the packet-switched apparatus reside in the same physical location. For example radio system 110 and dispatcher apparatus 140 may comprise a Public Safety Answering Point (PSAP). However, those of ordinary skill in the art will realize that the packet-switched apparatus may all reside at different physical locations and still be interconnected in accordance with the present invention.

Radio systems 110, 120 and 130 may be, for example, existing public safety systems serving various local fire, police and Emergency Medical Center (EMC) agencies or various state and federal agencies. These radio systems may include one or more base radio sites that may be used to enable communication between, for example, mobile and portable radios used by the public safety officers of the given agencies that may be coupled to the base radio site. The number of radio systems being interconnected in accordance with the present invention may be tailored to meet a customer's requirements.

Dispatcher apparatus 140, 150 and 160 are used by dispatchers (e.g., 142, 152 and 162) that are ideally trained in interoperability using the present invention as explained herein. Typically, each dispatcher apparatus includes a computer system, e.g., a personal computer, having a processing device and a storage device, a Graphical User Interface (GUI) for operating applications stored on the storage device and executed by the processing device and audio accessories operatively coupled to the GUI such as a headset, a microphone and one or more speakers. These dispatcher apparatus are ideally distributed throughout a given geographical coverage area to facilitate interoperability of packet-switched apparatus within that coverage area in accordance with the present invention. The number of dispatcher apparatus used in system 100 depends in part on the size of the coverage area and the anticipated number of radio systems, for instance, that may need to be interconnected.

The packet-switched apparatus (110-160) may be operatively coupled or interconnected to thereby communicate over a common packet-switched network 170, wherein the apparatus operate using a corresponding routing protocol that enables communication over that network. In the present example illustrated by reference to FIG. 1, the packet-switched apparatus are interconnected via an IP network 170 operated over a Wide Area Network (WAN) or a Local Area Network (LAN), for example, and each of the packet-switched apparatus are, accordingly, configured to run IP for communicating over the IP network. The Internet Protocol may be any version thereof such as IPv4 or IPv6 and may or may not support functionality such as Quality of Service (QoS), Multi-protocol Label Switching (MPLS), Virtual Private Network (VPN), etc., depending on the particular implementation. In other embodiments, packet-switching may, alternatively, be implemented using another protocol (e.g., X.25, which is another open standard protocol that was originally recommended by the International Consultative Committee for Telegraphy and Telephony (CCITT) called the International Telecommunication Union (ITU) since 1993) over a related packet-switched network 170.

Each packet-switched apparatus comprises a Soft Switch in accordance with the present invention that enables and facilitates peer-to-peer interoperability between the various apparatus over the network 170. The radio systems may include a Radio Soft Switch (e.g., 112, 122 and 132), and the dispatcher apparatus may include a Dispatcher Soft Switch (e.g., 144, 154 and 164). The differences between the Radio and Dispatcher Soft Switches will later be discussed. Each Soft Switch is ideally implemented as a software platform or stack (e.g., 133, 165) having process steps that may be stored on a storage device and executed by a processing device coupled to or included within the packet-switched apparatus, although those of ordinary skill in the art will realize that the Soft Switches may alternatively be implemented in hardware.

For example, a Radio Soft Switch for a radio system may be stored on a storage device and executed by a processing device included within or coupled to a base radio site operating within the radio system. A Dispatcher Soft Switch for a dispatcher apparatus may be stored on a storage device and executed by the processing device of the dispatcher apparatus. Moreover, the dispatcher using the packet-switched dispatcher apparatus ideally operates the Dispatcher Soft Switch using its GUI, and the GUI is further ideally coupled to the dispatcher's audio accessories to further facilitate interoperability using the present invention. For example from the GUI, the dispatcher may: establish and terminate interoperability connections between two or more packet-switched apparatus; see the status of these connections and the status of the Dispatcher Soft Switch; control the audio levels of the audio accessories in each connection; etc.

Each Soft Switch includes process steps for implementing a session layer framing protocol or method (e.g., 136, 168) in accordance with the present invention that facilitates the interoperability between the packet-switched apparatus (e.g., 110, 120, 130, 140, 150, and 160) and that enables the present invention to be implemented, in one embodiment, as a peer-to-peer solution for interoperability. Herein, peer-to-peer means that once a logical path is established through the network 170 between, for example, two packet-switched apparatus (i.e., a connection is established), communication frames may be transmitted over the connection without the need for a third-party application (e.g., a server). In other words, once a connection is established between two packet-switched apparatus, communication frames may be transmitted directly from one apparatus to the other over the established connection without any server intervention. This session layer protocol is also referred to herein as a peer-to-peer remote PTT framing layer (or RPDFL) without loss of generality and will be described below in detail.

Each Soft Switch stack further ideally includes an interface application (e.g., 134 for a radio system or 166 for a dispatcher apparatus). The interface application implements all the necessary hardware and software elements to communicate the plain media (e.g., audio, video or data) to the radio system in the case of a Radio Soft Switch or to interface the media to the dispatcher in the case of a Dispatcher Soft Switch. The radio and dispatcher interface applications may be implemented, for example, using a Four Wire Ear and Mouth (4W E&M, sometimes also referred to as 6W) interface, wherein the 4W lines carry the bi-directional base-band analog audio, and the E&M bi-directional signals instruct whether audio is incoming (E active) or outgoing (M active). Another industry standard that may be implemented is a 4W Tone Remote Control (TRC), wherein in-band tones are used to replace and extend the E&M signals to also include instructions to a radio to key-on the radio's transmitter to certain carrier frequencies. Moreover, the Dispatcher Soft Switch interface application should ideally: handle the dispatcher instructions as they arrive from the GUI application; control possible audio echo when hands free operation is used; mix together audio sources coming from multiple remote network connections into a single audio signal for the dispatcher's ear; etc.

Each Soft Switch stack also ideally includes a standard Session Initiation Protocol (SIP) User Agent (e.g., 135, 167) for use in establishing and terminating connections between two endpoints, wherein SIP is defined in IETF RFC 3261 and any corresponding subsequent RFC updates as recognized in the art. Finally, each Soft Switch stack ideally includes a protocol stack in accordance with the OSI model, for example, that includes the network layer (or Layer 3) that implements IP and the transport layer (Layer 4) that implements the User Datagram Protocol (UDP) or the Transport Control Protocol (TCP), which are also both standard protocols that are defined, respectively, in the IETF RFC 768 and RFC 793 and any corresponding subsequent RFC updates as recognized in the art. The network and transport layers are illustrated in FIG. 1 as UDP/IP layers 137 and 169, respectively, for the Radio Soft Switch stack and the Dispatcher Soft Switch stack. It should be understood by those of ordinary skill in the art that although each packet-switched apparatus in the interoperability network 100 is illustrated as implementing a single Soft Switch, any or all of the packet-switched apparatus may implement multiple Soft Switches without loss of generality.

Returning again to the elements of interoperability system 100 in FIG. 1, ideally system 100 also includes one or more SIP Servers 190, e.g., standard SIP proxy or redirect servers in accordance with RFC 3261 used to facilitate the logical connections as discussed above between the packet-switched apparatus. Those of ordinary skill in the art will realize that other signaling protocol may be used to establish the logical connection such as, for instance the H.323 protocol standards for multi-based multimedia communication systems as defined in documents created by the ITU. Moreover, system 100 also ideally includes one or more Operation and Maintenance Center (OMC) servers 180, which provide standard operation and maintenance services to the packet-switched apparatus. These services may include, for example, software load management that allows the OMC to upgrade the software version of all the Soft Switches in the interoperability system (e.g. to add new features, etc.) and fault management that allows the OMC to monitor the health of all the Soft Switches in the interoperability system and to initiate a maintenance or repair action when needed.

The need for a central server to facilitate interoperability is, thereby, eliminated by the use of the individual Soft Switches and their associated RPDFL functionality. The SIP and OMC servers do not function as central servers for interoperability but are used only for management functions. Thus, interoperability between the distributed Soft Switches to transfer, for example, voice, data or video between disparate radio systems and dispatcher apparatus, for instance, can be realized even in the absence of these two servers. Moreover, interoperability using various Soft Switch implementations in accordance with the present invention facilitates a more graceful expansion of the interoperability system at a lower cost than that realizable in the prior art client-server based solutions.

As illustrated in FIGS. 2-7, peer-to-peer connections in accordance with various embodiments of the present invention may be established between packet-switched apparatus using the Soft Switches corresponding to the apparatus. In some embodiments, a single peer-to-peer connections may be formed to patch together two packet-switched apparatus for purposes of interoperability. In other embodiments, interoperability groups may be formed out of multi peer-to-peer connections. The "connections," which are shown as dashed lines in each of FIGS. 2-7, are session layer RPDFL connections, which are later described in detail. These are but a few embodiments of how packet-switched apparatus may be interconnected for purposes of interoperability using RPDFL peer-to-peer connections in accordance with the present invention. However, those of ordinary skill in the art can contemplate numerous additional embodiments.

Figure 2:
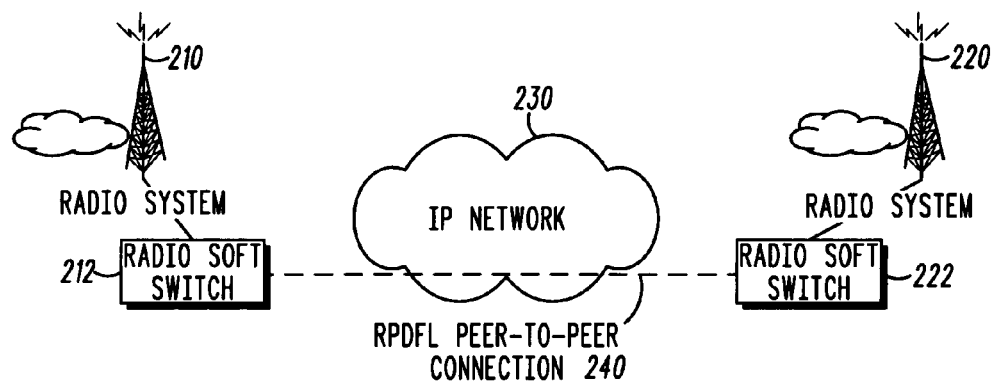
FIG. 2 illustrates a one-to-one peer-to-peer connection between two radio systems in accordance with an embodiment of the present invention.
Figure 3:
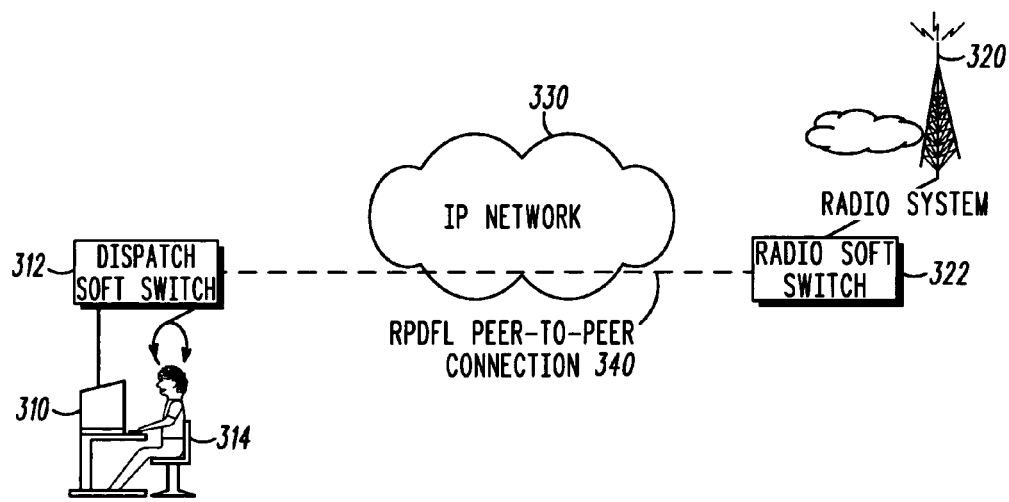
FIG. 3 illustrates a one-to-one peer-to-peer connection between a dispatcher and a radio system in accordance with an embodiment of the present invention.

For example, FIG. 2 illustrates interoperability over an IP network 230 by forming a one-to-one peer-to-peer connection 240 between a radio system 210 having a Radio Soft Switch 212 in accordance with the present invention and a radio system 220 having a Radio Soft Switch 222 in accordance with the present invention. Similarly, FIG. 3 illustrates a one-to-one peer-to-peer connection 340 over an IP network 330 between a dispatcher apparatus 310 having a Dispatcher Soft Switch 312 operated by a dispatcher 314 in accordance with the present invention and a radio system 320 having a Radio Soft Switch 312 in accordance with the present invention.

Figure 4:
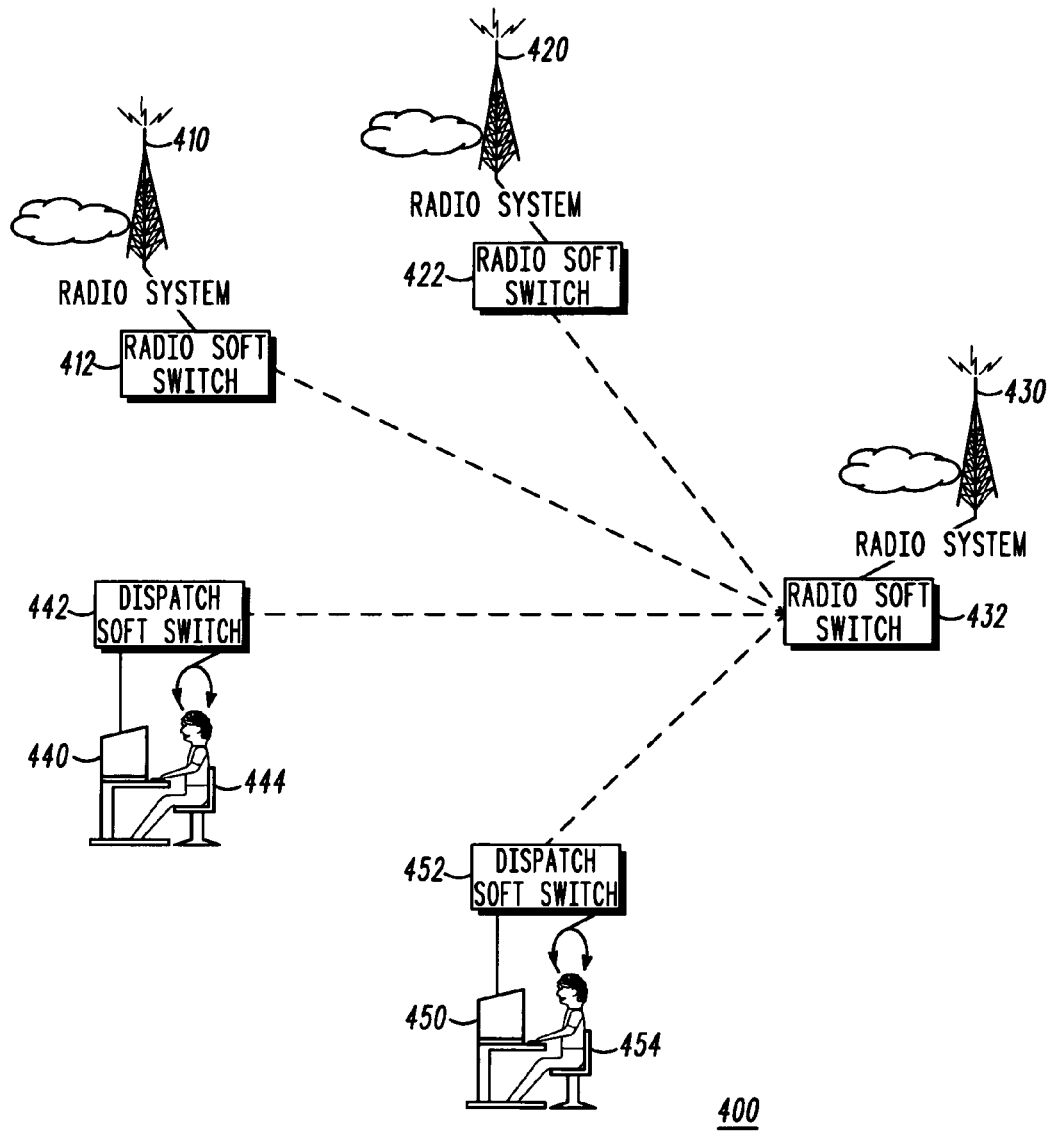
FIG. 4 illustrates an exemplary radio system sharing group in accordance with an embodiment of the present invention.

FIG. 4 illustrates an exemplary radio system sharing group (interoperability system) 400 formed in accordance with an embodiment of the present invention. Group 400 includes a radio system 410 that includes a Radio Soft Switch 412, a radio system 420 that includes a Radio Soft Switch 422, a radio system 430 that includes a Radio Soft Switch 432, a dispatcher apparatus 440 that includes a Dispatcher Soft Switch 442 operated by a dispatcher 444, and a dispatcher apparatus 450 that includes a Dispatcher Soft Switch 452 operated by a dispatcher 454. The packet-switched apparatus (e.g., the radio systems and the dispatcher apparatus) are operatively coupled via a set of many peer-to-peer connections illustrated as dashed lines.

In this embodiment, floor management for the group of packet-switched apparatus may be performed by one of the packet-switched apparatus (in this case radio system 430). Accordingly, all of the other packet-switched apparatus have one-to-one peer-to-peer connections with radio system 430 similar to the ones illustrated in FIG. 2 and FIG. 3, such that apparatus 410, 420, 440 and 450 all share radio system 430. Floor management is defined herein as a set of rules that allow the sharing of media between multiple users and in the present invention is implemented by process steps included in the Soft Switch as part of the RPDFL protocol and will be explained below in more detail. The floor management may be used, for example, to perform such functions as: "set the floor" to (i.e., select) one of the packet-switched apparatus to transmit media when multiple apparatus simultaneously issue a request to transmit (e.g., via signaling a Push-to-Talk (PTT) request); let all the users of apparatus included in system 400 know of the shared radio 430 state (e.g., receive (Rx), transmit (Tx), IDLE); and let all the users hear or view the Rx and Tx-monitor media (e.g., audio, video or data) sent from any packet-switched apparatus in interoperability system 400.

Figure 5:
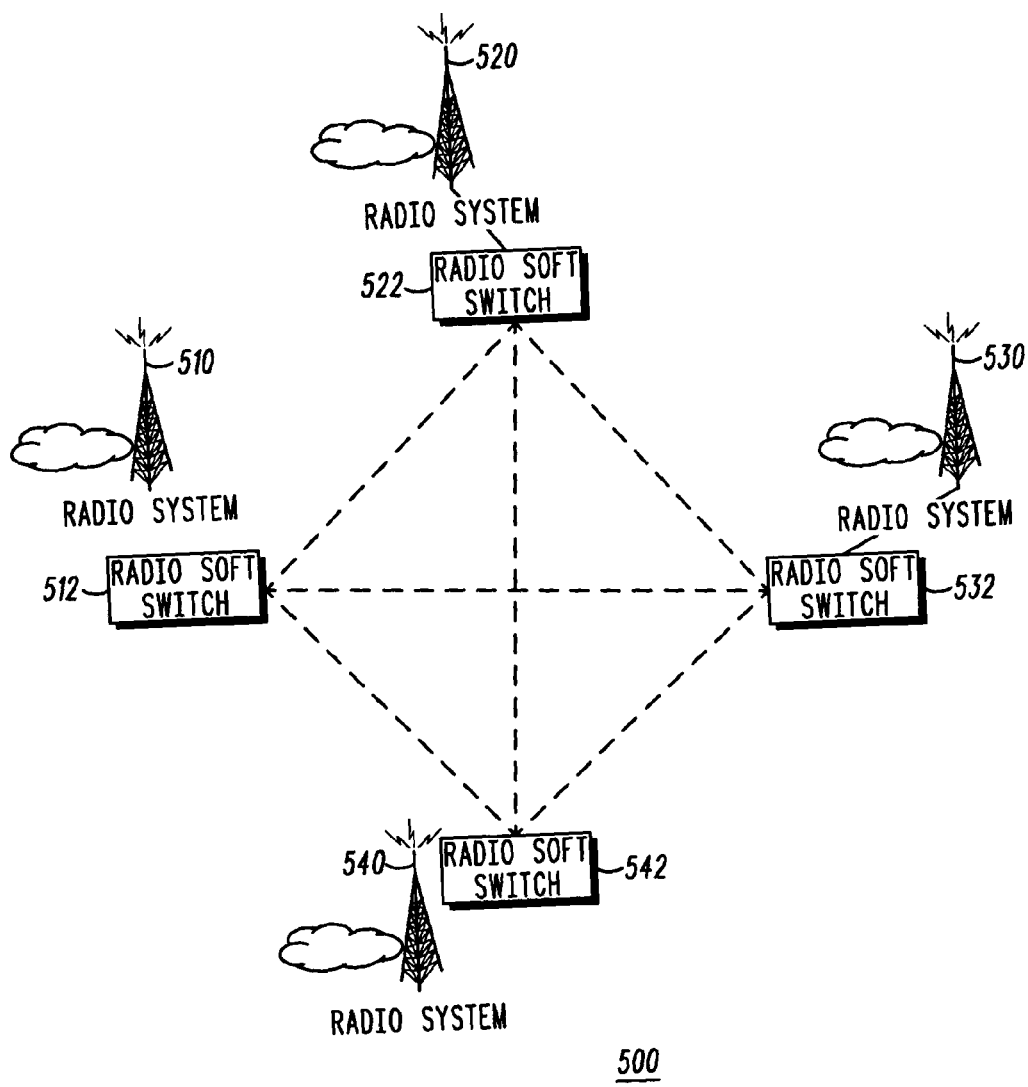
FIG. 5 illustrates a plurality of exemplary radio system sharing groups in accordance with an embodiment of the present invention.

FIG. 5 illustrates a plurality of exemplary radio system sharing groups (also referred to as a radio systems group 500) in accordance with an embodiment of the present invention. The radio systems sharing groups are formed from a group of packet-switched apparatus, wherein floor management may be performed by at least a portion of and ideally all of the apparatus in the group. In this particular illustration, the set of packet-switched apparatus includes: a radio system 510 that includes a Radio Soft Switch 512 in accordance with the present invention; a radio system 520 that includes a Radio Soft Switch 522 in accordance with the present invention; a radio system 530 that includes a Radio Soft Switch 532 in accordance with the present invention; and a radio system 540 that includes a Radio Soft Switch 542 in accordance with the present invention.

As stated above, ideally each of the Radio Soft Switches in radio systems group 500 has floor management capabilities. In addition, for a group of N packet-switched apparatus: N different packet-switched apparatus sharing groups (as in FIG. 4) may be formed using $N*(N-1)/2$ peer-to-peer connections. Thus in this example of four radio systems, four radio sharing groups may be formed using six peer-to-peer connections. Those of ordinary skill in the art will realize that although all radio systems were used in the FIG. 5 illustration, dispatcher apparatus may share any of the radio systems shown in FIG. 5 in accordance with the illustration of FIG. 4. An exemplary benefit of the interoperability structure of FIG. 5 is that there is no single point of failure. If one Soft Switch in the system becomes inoperable, interoperability between the remaining apparatus in the system may be sustained using any of the remaining Soft Switches having floor management capabilities.

Figure 6:
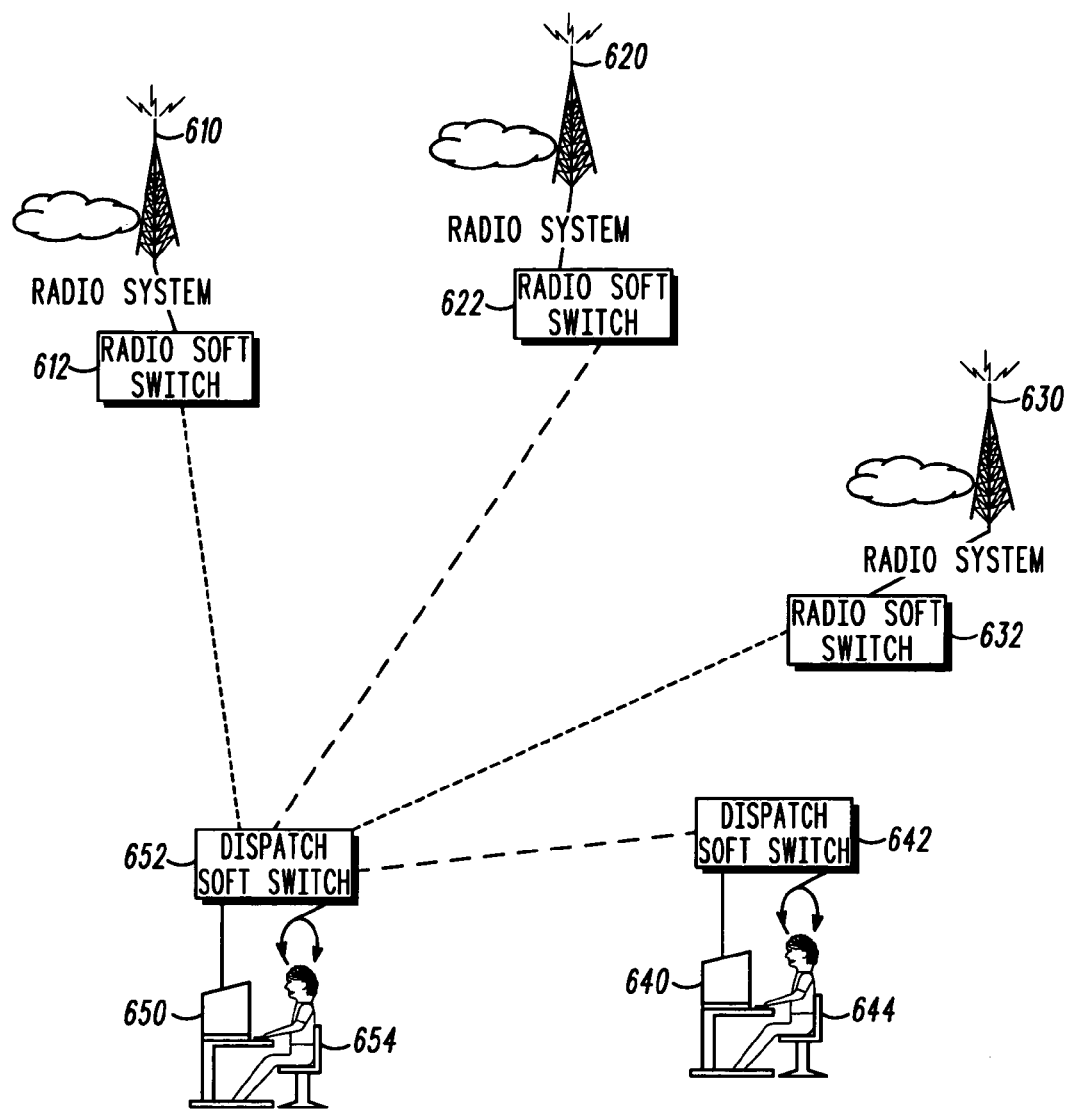
FIG. 6 illustrates an exemplary dispatcher announcement group in accordance with an embodiment of the present invention.

FIG. 6 illustrates an exemplary dispatcher announcement group 600 in accordance with an embodiment of the present invention. The announcement group 600 is formed using a set of RPDFL peer-to-peer connections between a dispatcher apparatus 650 to packet-switched apparatus 610, 620, 630 and 640. Dispatcher apparatus 640 and 650, respectively, include Dispatcher Soft Switches 642 and 652 in accordance with the present invention, and are operated, respectively, by dispatchers 644 and 654. Radio systems 610, 620 and 630, respectively, include Radio Soft Switches 612, 622 and 632 in accordance with the present invention. Using this configuration, the dispatcher 654 may key-up and speak to all of the packet-switched apparatus in his announcement group (or a subset thereof) all at once. In addition, the dispatcher 654 may hear the audio, for example, from the remote packet-switched apparatus (or a subset thereof) all at once, using any conventional and suitable type of stereo or mono audio mixing. Moreover, any of the radio systems shown in FIG. 6 may be involved in radio sharing or may be part of a radio system group in accordance with FIG. 4 and FIG. 5, and the dispatcher 644 may similarly have his own announcement group.

Figure 7:
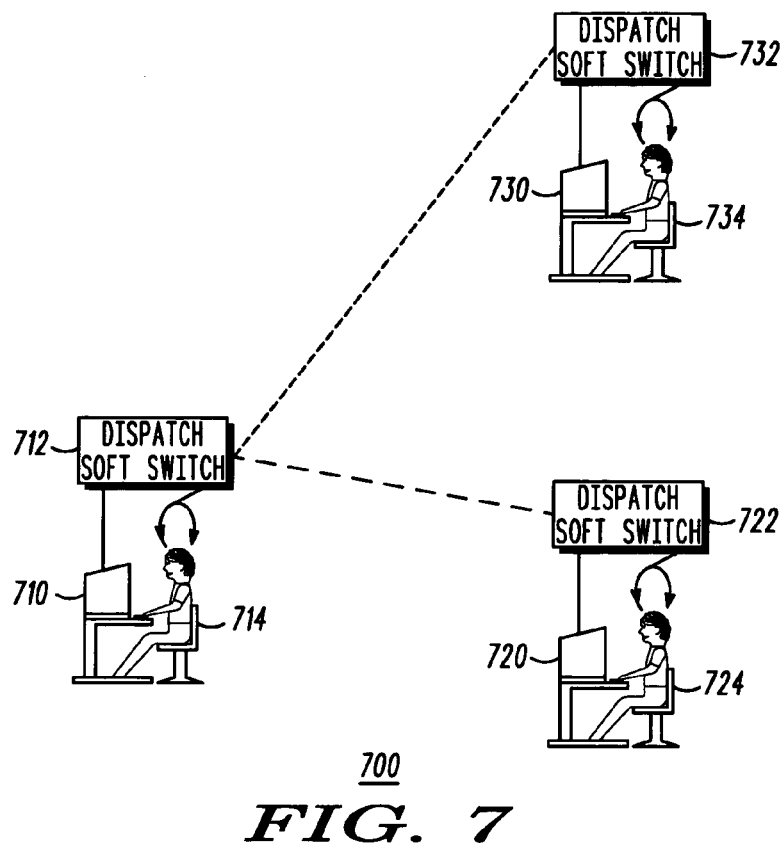
FIG. 7 illustrates an exemplary dispatcher conference group in accordance with an embodiment of the present invention.

FIG. 7 illustrates an exemplary dispatcher conference group 700 in accordance with an embodiment of the present invention. The conference group 700 is formed using a set of RPDFL peer-to-peer connections between a dispatcher apparatus 710 to dispatcher apparatus 720 and 730. Dispatcher apparatus 710, 720 and 730, respectively, include Dispatcher Soft Switches 712, 722 and 732 in accordance with the present invention, and are operated, respectively, by dispatchers 714, 724 and 734. Using this configuration, the dispatcher 714 may run a conference bridge using the Soft Switch 712 interface application over the peer-to-peer connections so that everyone connected to the conference bridge can hear everyone who speaks. It should be realized by those skilled in the art that dispatcher 714 may have in parallel a dispatcher announcement group as shown in FIG. 600, and dispatchers 724 and 734 may similarly have their own announcement group and/or conference with different dispatchers. Moreover, any SIP enabled IP Soft-phone may be joined to the conference, and any Public Switched Telephone Network (PSTN) phone line may be joined to the conference through a standard SIP gateway.

Figure 8:
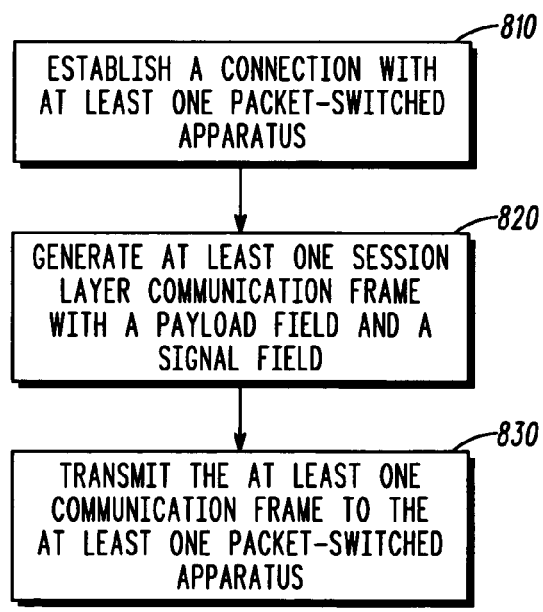
FIG. 8 is a flow diagram illustrating a method for enabling interoperability between two packet-switched apparatus.

In general, a packet-switched apparatus implements the method illustrated in the flow diagram of FIG. 8 for enabling interoperability between itself and at least one other packet-switched apparatus. Those steps include: establishing a connection with at least one other packet-switched apparatus (810); generating at least one communication frame at the session layer comprising a payload field for carrying a payload and a signal field for carrying a control signal (820); and transmitting the at least one communication frame to the at least one packet-switched apparatus (830). These steps are more specifically described below by reference to FIG. 9 and FIG. 10.

In addition, dynamic management of the above described RPDFL peer-to-peer connections as illustrated in FIGS. 2-7 is ideally the responsibility of one or more interoperability dispatchers. Accordingly, typically a dispatcher using dispatcher apparatus would use his GUI to command his Dispatcher Soft Switch to initiate and terminate the connections for establishing interoperability networks in accordance with the present invention. For small interoperability networks, fixed routing tables in each Soft Switch, for example, coupled with the use of any suitable proprietary signaling protocol may be sufficient to provide the required connections management functionality. However, as the interoperability system grows to connect larger numbers of radio systems and dispatchers, a session layer standard signaling and naming convention protocol may, alternatively, be used for the connections management. For example, SIP may be used to manage logical connections between the packet-switched apparatus because SIP allows simple standard extensions to support the RPDFL connections. Thus, each Soft Switch in the interoperability network ideally runs a SIP-UA (User-Agent), and each Soft Switch ideally has a unique SIP URI (User Registration Identity). Moreover, for the larger interoperability networks, the OMC may be used to publish the most updated "interoperability phone book" to the logged-on dispatchers, which identifies, for example, all the available packet-switched apparatus in the interoperability network.

Figure 9:
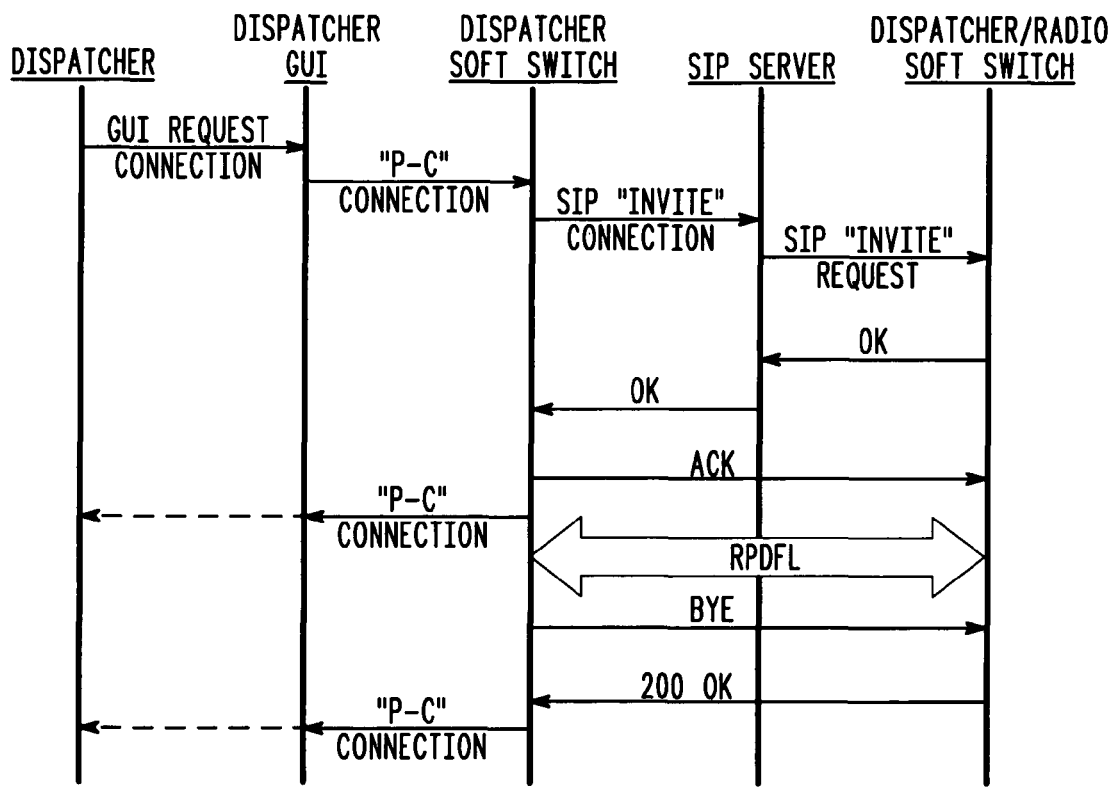
FIG. 9 is a bounce diagram illustrating a dispatcher to radio connection establishment and termination in accordance with an embodiment of the present invention.
Figure 10:
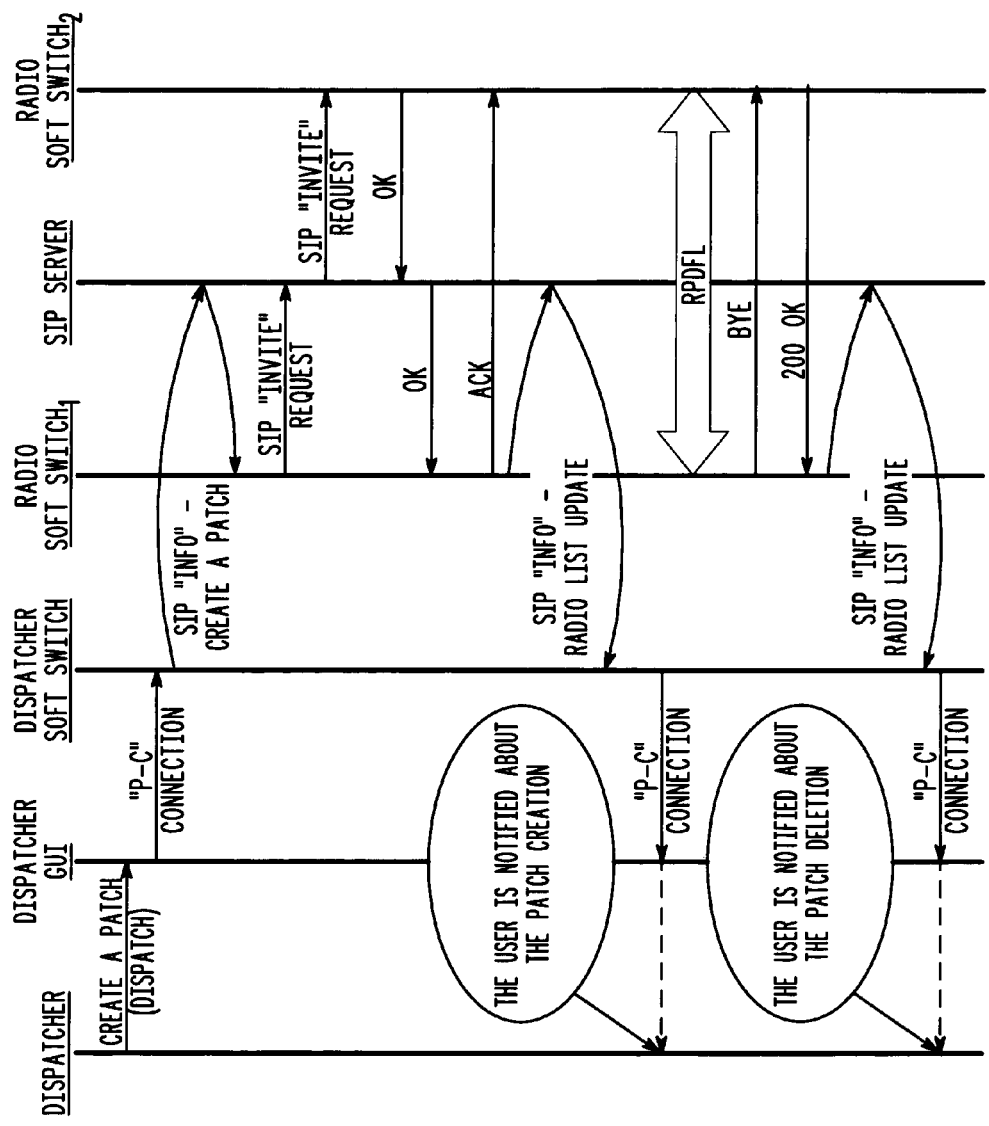
FIG. 10 is a bounce diagram illustrating a radio to radio connection establishment and termination created by a dispatcher apparatus in accordance with an embodiment of the present invention.

Accordingly, the RFPDL peer-to-peer connections may be established and terminated using SIP protocol, ideally with special Session Description Protocol (SDP) fields to inform of connection parameters (e.g., encryption keys, vocoder being used, etc.), wherein SDP is a standard protocol used for describing multimedia sessions and is defined in IETF RFC 2327 and any corresponding RFC updates as recognized in the art. FIG. 9 is a bounce diagram illustrating the signaling flow for establishing and terminating a dispatcher apparatus to radio system RPDFL peer-to-peer connection in accordance with an embodiment of the present invention. RPDFL connections illustrated as dashed lines in FIGS. 3, 4, 6 and 7, for instance, may be established in accordance with FIG. 9. FIG. 10 is a bounce diagram illustrating the signaling flow for establishing and terminating a radio system to radio system connection created by a dispatcher apparatus in accordance with an embodiment of the present invention. RPDFL connections illustrated as dashed lines in FIGS. 2, 4 and 5, for instance, may be established in accordance with FIG. 10.

As illustrated in FIG. 9, a dispatcher may use the GUI of her dispatcher apparatus to request a peer-to-peer connection, for example between the dispatcher apparatus and another packet-switched apparatus (i.e., the destination apparatus). The GUI then couples this request, ideally using a conventional personal computer control "P-C" connection interface, to the corresponding Dispatcher Soft Switch, which initiates a SIP Invite Request to the SIP Server. The SIP server forwards this SIP Invite to the Soft Switch of the destination apparatus. Upon accepting the SIP Invite, the destination apparatus Soft Switch sends the Dispatch Soft Switch an OK to the SIP Invite via the SIP Server, and the Dispatch Soft Switch sends a return acknowledgement (ACK) to the destination apparatus Soft Switch via the SIP Server. The RPDFL peer-to-peer connection is thus established, and the two Soft Switches can directly exchange media by way of this established connection. To terminate the connection, for instance when the first responders leave the scene, one of the Soft Switches (e.g., the Dispatch Soft Switch based on the dispatcher using the GUI to request the termination of the RPDFL connection, which is forwarded using a P-C connection to the Dispatcher Soft Switch) sends a SIP BYE via the SIP Server to the other Soft Switch (e.g., the destination apparatus Soft Switch), whereupon the other Soft Switch responds via the SIP Server with a SIP 200 OK. Ideally, confirmation of the RPDFL connection establishment and termination can be communicated from the Dispatcher Soft Switch to the GUI using a P-C connection so that the dispatcher can be visually or audibly notified.

As illustrated in FIG. 10, a dispatcher may use the GUI of his dispatcher apparatus to create a patch between two packet-switched apparatus (e.g. between two radio systems). In this example, let one radio system to the desired connection be the source apparatus and the other radio system be the destination apparatus. The GUI then couples this patch initiation to the corresponding Dispatcher Soft Switch via a P-C connection. The Dispatcher Soft Switch then forwards a SIP INFO message having the patch destination information (e.g., the source and destination apparatus to the patch connection) to the SIP Server for creating the patch between the source and destination apparatus. A SIP INFO message is a special SIP message as defined in RFC 3261 that allows one SIP UA to send "information" to another SIP UA. The SIP Server forwards the SIP INFO message with the patch destination information to the Radio Soft Switch of the source apparatus, which then sends a SIP Invite to the Radio Soft Switch of the destination apparatus via the SIP Server.

Upon accepting the SIP Invite, the destination apparatus Soft Switch sends the source apparatus Soft Switch an OK to the SIP Invite via the SIP Server and the source apparatus Soft Switch sends a return ACK to the destination apparatus Soft Switch via the SIP Server. The RPDFL peer-to-peer connection is thus established, and the two Radio Soft Switches can directly exchange media by way of this established connection. Moreover, the dispatcher that initiated the patch may be notified of the establishment of the RPDFL connection, for example, by a SIP INFO message that includes a Radio List Update coupled from the source apparatus Soft Switch to the Dispatch Soft Switch via the SIP server and further forwarded to the GUI using a P-C connection so that the dispatcher can be visually or audibly notified. The Radio List Update may be an update of a list of radio sharing groups including all of the remote Soft Switches having an RPDFL connection with the source and destination Radio Soft Switches.

To terminate the connection, for instance when the first responders leave the scene, one of the Soft Switches (e.g., the source apparatus Soft Switch) sends a SIP BYE via the SIP Server to the other Soft Switch (e.g., the destination apparatus Soft Switch), whereupon the other Soft Switch responds via the SIP Server with a SIP 200 OK. Typically, the dispatcher would initiate the connection termination using the GUI to request a patch deletion. The patch deletion request is forwarded to the Dispatcher Soft Switch via a P-C connection and then further coupled via the SIP Server to the source apparatus in a SIP INFO message having the patch deletion information. Moreover, the dispatcher that initiated the patch may also be notified of the termination of the RPDFL connection by a SIP INFO Radio List Update from the source apparatus Soft Switch to the Dispatcher Soft Switch via the SIP Server and further forwarded to the GUI using a P-C connection so that the dispatcher may be visually or audibly notified.

Figure 11:
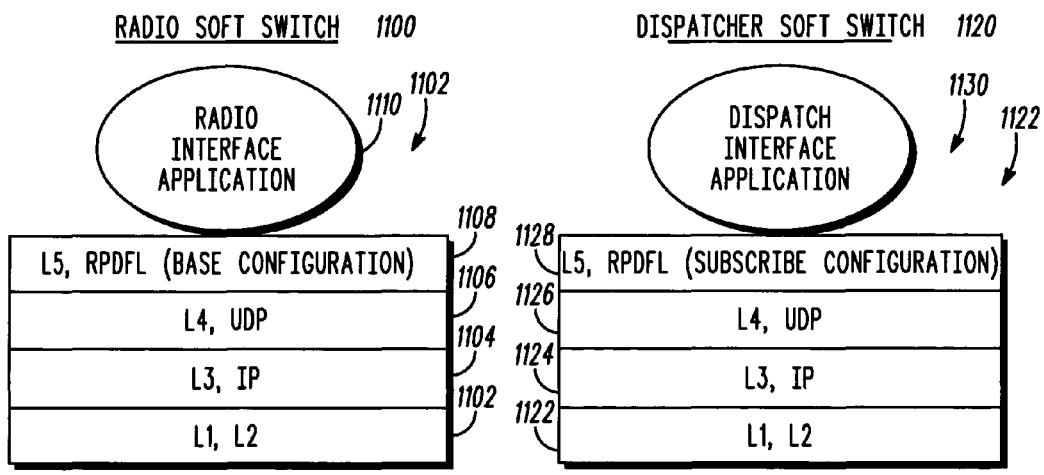
FIG. 11 is an OSI protocol stack for a Radio Soft Switch and a Dispatcher Soft Switch in accordance with an embodiment of the present invention.

As discussed earlier, interoperability in accordance with the present invention is enabled due to the RPDFL session layer stack included in each Soft Switch of the present invention. Details regarding this RFPDL stack will next be discussed. FIG. 11 shows an OSI stack 1102 included within an exemplary Radio Soft Switch 1100, and an OSI stack 1122 included within an exemplary Dispatcher Soft Switch 1120.

Each OSI stack, thus, would typically include the seven corresponding layers: the physical and data link layers 1102, 1122 (or, respectively, L1, L2); the network layer 1104, 1124 (or L3 ideally running IP); the transport layer 1106, 1126 (or L4 ideally running UDP); the session layer 1108, 1128 (or L5 ideally running RPDFL, with a base configuration in the Radio Soft Switch and a subscribe configuration in the Dispatcher Soft Switch); and the application and presentation layers (running at least the Radio Interface Application 1110 in the Radio Soft Switch and the Dispatch Interface Application 1130 in the Dispatcher Soft Switch). The primary difference between the base and subscribe configuration is that the base configuration ideally includes floor management functionality as later described in detail.

Figure 12:
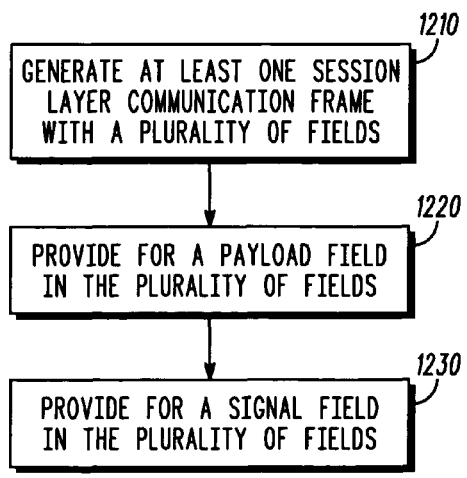
FIG. 12 is a flow diagram illustrating a method for session layer framing to achieve interoperability in accordance with an embodiment of the present invention.

One feature of the RPDFL protocol is that it enables the combination of payload (e.g., audio, video or data) with control signaling (e.g., radio control signaling) in the same communication frame, i.e., a framed packet that is transmitted via an established connection between two packet-switched apparatus. This enables many potential problems within the resultant interoperability system to be addressed. For example, the present invention improves reliable, survivability and minimum possible PTT latency within the interoperability system. In general a packet-switched apparatus using its RPDFL protocol would implement the steps in the flow diagram of FIG. 12 for session layer framing for enabling interoperability with another packet-switched apparatus. These steps include: generating a communication frame at the session layer comprising a plurality of frames (1210); providing for a payload field in the plurality of fields for carrying a payload (1220); and providing for a signal field in the plurality of fields for carrying a control signal (1230).

Figure 13:
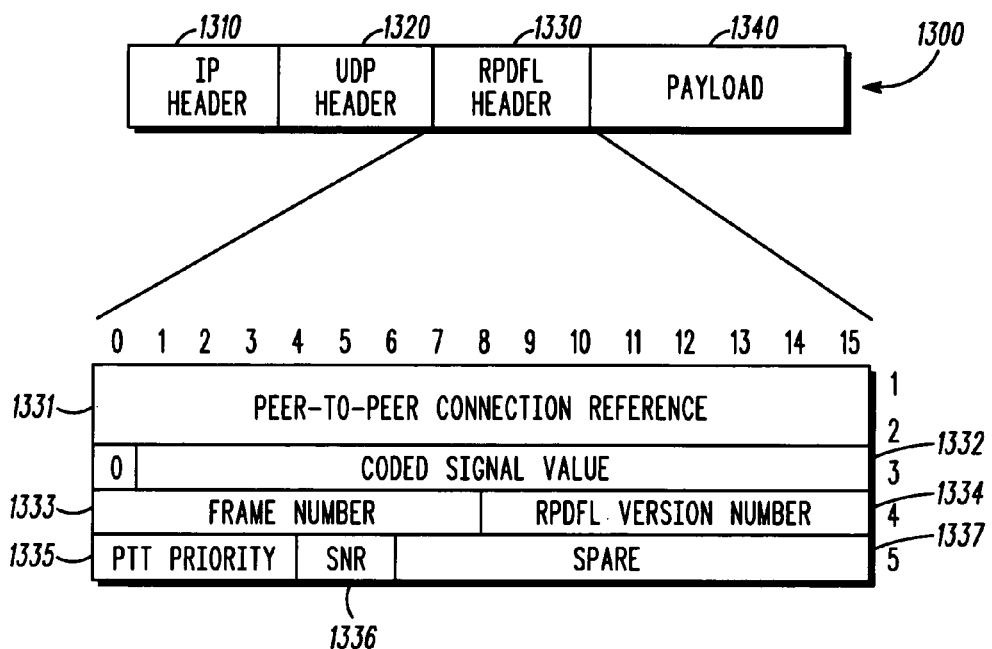
FIG. 13 illustrates an exemplary communication frame and corresponding RPDFL header in accordance with an embodiment of the present invention.

FIG. 13 illustrates an exemplary packet 1300 that has been processed at L5, L4 and L3 of, for example, OSI stack 1102 or 1130 (FIG. 11) and that, therefore, includes an IP header 1310, a UDP header 1320, an RPDFL header 1330 and the payload 1340 with contents that may or may not be encrypted. Also illustrated in FIG. 13 is the expanded RPDFL header, which includes the ideal fields to be used in the header. These fields include a "Coded Signal Value" field 1332 ideally having a length of 15 bits, and may also include a "Peer-to-Peer Connection Reference" field 1331 ideally having a length of 32 bits, a "Frame Number" field ideally having a length of 8 bits, a "RPDFL Version Number" field ideally having a length of 8 bits, a "PTT Priority" field ideally having a length of 4 bits, a "SNR" field ideally having a length of 2 bits, and a "Spare" field ideally having a length of 10 bits. These fields are discussed in more detail below.

Turning first to the "Coded Signal Value" field, this field is used to carry the control signaling for each interoperability packet that is transmitted and may include, for example, radio control signals. Table 1 is illustrative of some RPDFL coded signal values that may be used and their corresponding names and descriptions. Those of ordinary skill in the art will understand that these are just examples of the types of signal indications that may be used and their associated values and definitions and that this table is in no way intended to limit the scope of the present invention.

TABLE 1

RPDFL Coded SIGNAL Values

| SIGNAL Name | Coded SIGNAL Value | SIGNAL Description |
| --- | --- | --- |
| Is_D_Alive | 0x0B81 | Query if the Destination Station is "Alive?" |

TABLE 1-continued

RPDFL Coded SIGNAL Values

| SIGNAL Name | Coded SIGNAL Value | SIGNAL Description |
| --- | --- | --- |
| D_is_Alive | 0x1702 | The Destination station is "Alive!" |
| PTT_P | 0x1C83 | PTT is pressed. Media is on the way. |
| PTT | 0x2E04 | PTT is pressed. The packet contains media. |
| PTT_R | 0x2585 | PTT is released. No media is coming. |
| Tx_MON_A | 0x5C08 | The packet contains media transmitted by this radio (Tx LED is active) |
| Tx_MON_O | 0x5789 | No media is coming from this radio (Tx LED goes inactive) |
| DATA | 0x798D | Packet contain non-voice data |

A method in accordance with the present invention may be used to increase the reliability within the interoperability system that radio systems are appropriately keyed-on and keyed-off as desired. This is obviously very important in a mission critical public safety environment. In general, IP networks can be congested at busy or crisis hours when a large amount of data is passed though the network. At such a time of congestion, IP routers in the network may throw away IP packets thus creating IP packet loss, which has to be accommodated in order to assure reliable operation of the interoperability network. In addition, a noisy and congested IP network may create undesired phenomena such that radio systems are keyed-on randomly (or remain keyed when they should not be) based upon the PTT signaling being inaccurately received. The PTT timing latency in an interoperability public safety radio system, for example, can be a crucial factor for successful interoperability. Late PTT operation can cause the voice being transferred from one system to the other to be clipped thus causing dangerous scenario's such as the remote side hearing "'T SHOOT" instead of "DON'T SHOOT," which was what was being transmitted.

Figure 14:
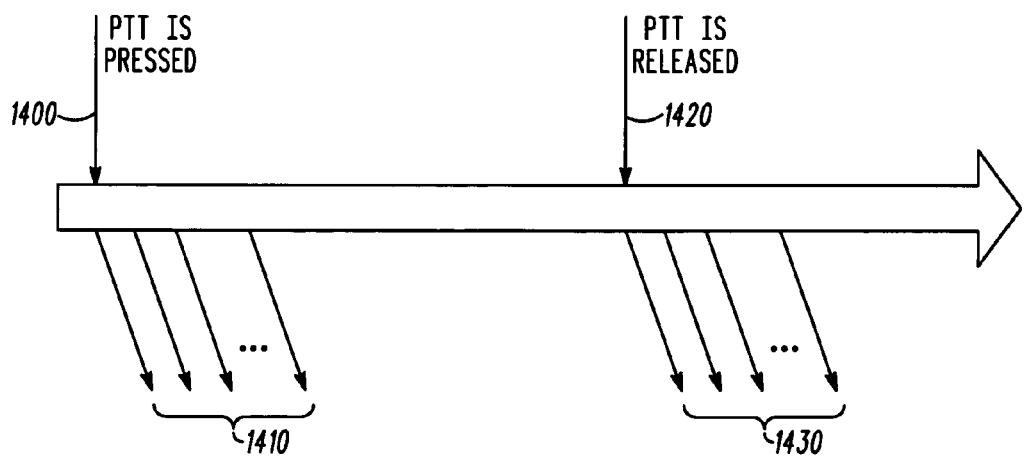
FIG. 14 illustrates "PTT_P" and "PTT_R" signal timing in accordance with an embodiment of the present invention.

First, to enhance reliable radio signaling in general over a noisy IP network, the Coded Signal Value may be protected by any suitable Forward Error Correction code (e.g., a Bose-Chaudhuri-Hochquenghem (BCH) code 87, 15 that is well known in the art). In addition, reliability with respect to the PTT signaling may be enhanced by sending the packet having the PTT signal (e.g., PTT_P 1400, PTT_R 1420) to a destination packet-switched apparatus a predetermined number of times 1410, 1430 (e.g., five or seven times) as illustrated in FIG. 14. The number of such packets sent may be determined, for example, as a function of the expected worst case congestion scenario of the interoperability system to enable at least one of the packets to reach the destination apparatus. The packets may be sent, for example, every 1 msec, and no ACK is expected from the destination apparatus. The destination apparatus may then be keyed-on (or keyed-off) upon receipt of at least one packet with the PTT signal.

Figure 15:
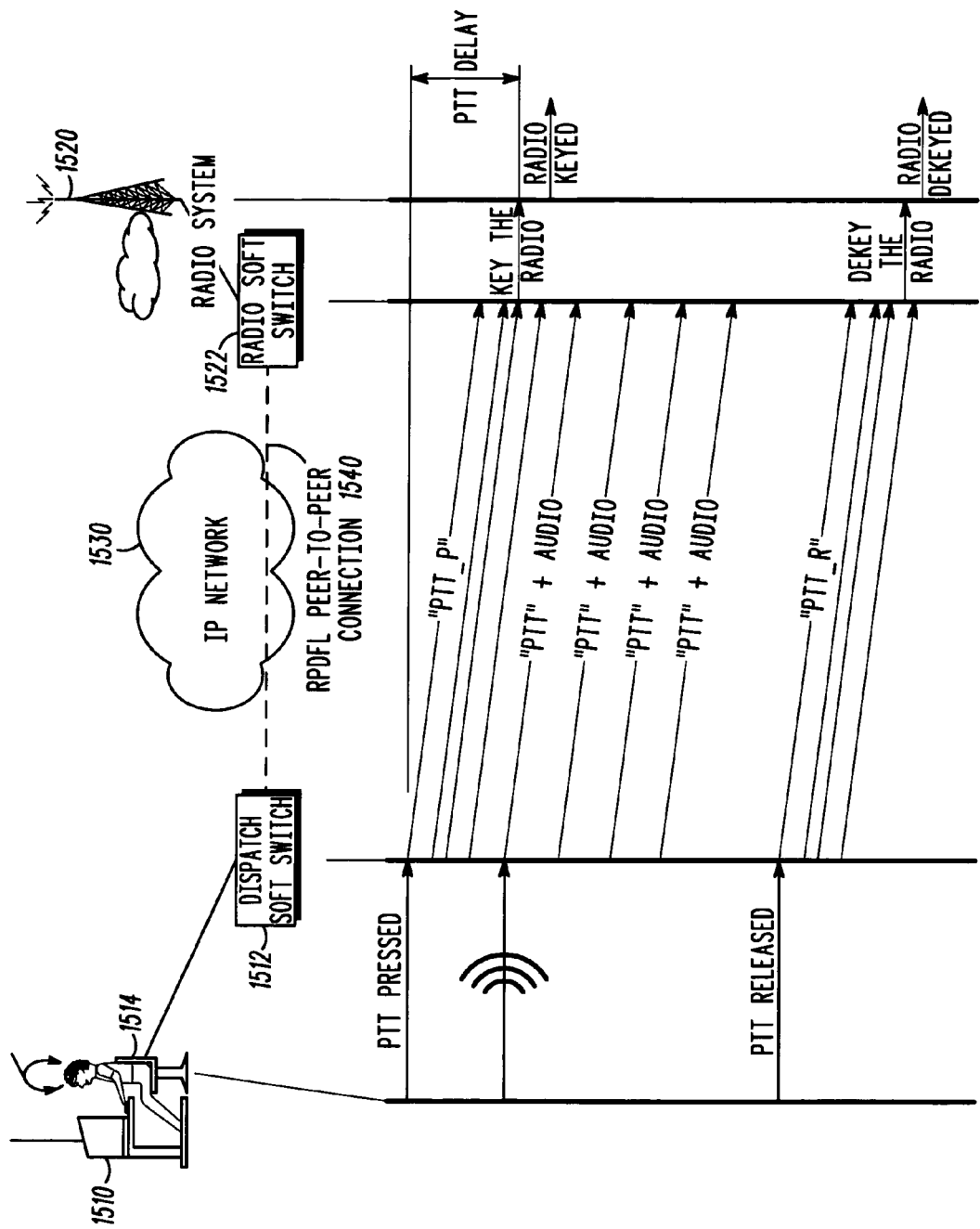
FIG. 15 is a bounce diagram illustrating minimum PTT latency using the RPDFL protocol in accordance with an embodiment of the present invention.

FIG. 15 illustrates this process in additional detail. FIG. 15 shows a dispatcher apparatus 1510 having a Dispatcher Soft Switch 1512 operated by a dispatcher 1514, which has established an RPDFL peer-to-peer connection 1540 across an IP Network 1530 between his Soft Switch 1512 and a Radio Soft Switch 1522 of a radio system 1520. The dispatcher 1514 now wants to key-on the radio system 1520 to communicate with field personnel, for instance, who use the radio system 1520. Accordingly, the dispatcher 1514 may press a PTT button coupled to the dispatcher apparatus 1510 that causes the Dispatcher Soft Switch 1512 to generate and transmit to the Radio Soft Switch 1522 a predetermined number of packets having the PTT_P coded signal value in the Control Signal Value field of the RPDFL header of the packets. The Dispatcher Soft Switch 1512 thus processes the dispatcher's PTT pressed indication with virtually no timing overhead because once the Soft Switch 1512 detects that the PTT button (or other PTT indication) is active, Soft Switch 1512 immediately generates and sends the PTT Pressed packets while the voice is processed in parallel. A further benefit of the connection 1540 is that the packets, including those with the PTT_P signal values may be sent directly over the RPDFL peer-to-peer connection to the remote side with no additional server intervention, thus taking the shortest possible route.

On the radio system side, upon receiving at least one packet having the PTT_P coded signal, the Radio Soft Switch 1522 keys-on the radio system. On the dispatcher apparatus side, the dispatcher 1514 begins, for instance, to speak after pressing the PTT button. The Dispatcher Soft Switch packetizes the audio with the corresponding PTT control signal for transmission via the connection 1540 and begins to transmit the packets with the audio after the last packet having the PTT_P signal is transmitted. The radio system 1520 having been keyed-on is ready to transmit the audio over the air.

When the dispatcher 1514 finishes speaking and has released his PTT button, similarly, the Dispatcher Soft Switch 1512 generates and transmits to the Radio Soft Switch 1522 a predetermined number of packets having the PTT_R coded signal value in the Control Signal Value field of the RPDFL header of the packets. The Dispatcher Soft Switch 1512 also processes the dispatcher's PTT release indication with virtually no timing overhead because once the Soft Switch 1512 detects that the PTT button (or other PTT indication) is inactive, Soft Switch 1512 immediately generates and sends the PTT Released packets. Upon receiving at least one packet having the PTT_R coded signal, the Radio Soft Switch 1522 will complete the delivery of the audio signal to be transmitted through the radio system and then key-off the radio system.

Using the process described above by reference to FIGS. 14 and 15, interoperability systems in accordance with the present invention have achieved reliability in some instances of 99.999% in PTT remote operation over an IP network which may suffer from 5% packet loss and 0.1% of bit-error-rate. Moreover, a 15 msec maximum PTT latency has been achievable over a Local Area Network. Moreover, any increase in packet loading over the IP network that results from sending multiple PTT_P and PTT_R packets is negligible. More specifically, a typical radio key-on period by a dispatcher is 10-20 seconds, during which 500-1000 audio packets may be sent (assuming 20 milliseconds audio frames). Thus, the addition of five "PTT-P" packets on the start and five "PTT-R" packets on the end is negligible and does not cause any increase in packet loss rates over the IP network.

When many remote radio systems and dispatcher apparatus share the same radio system interface (as illustrated is FIG. 4 where the shared radio system is radio system 430 and FIG. 5 where a plurality of radio system sharing groups may be formed), a floor management mechanism is useful to afford every remote packet-switched apparatus in the interoperability system the opportunity to transmit into the shared radio system and to receive media being received or transmitted from the shared radio system. The RPDFL protocol in accordance with the present invention provides for such floor management without the need for a central server (as in the client-server based solutions) because floor management may be done by the distributed Soft Switches in the interoperability system.

Figure 16:
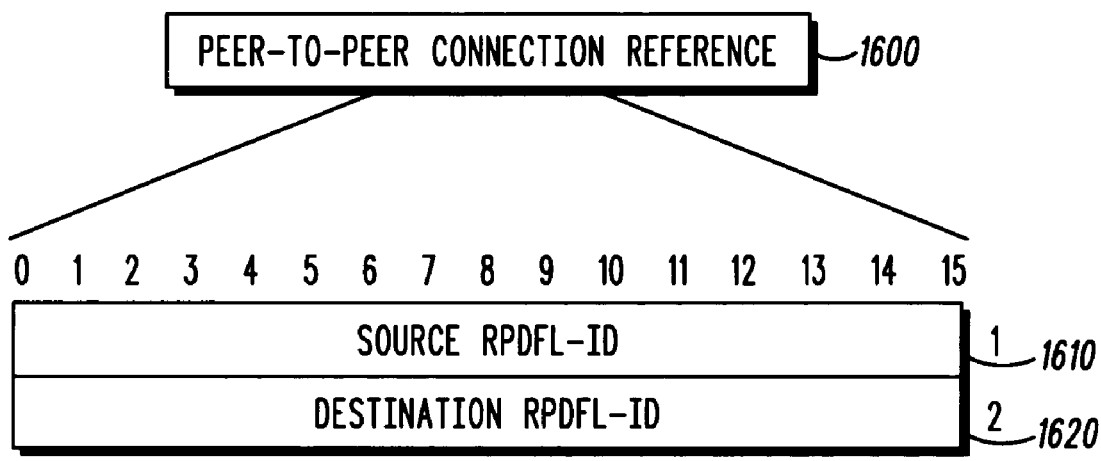
FIG. 16 illustrates a peer-to-peer connection reference field of an RPDFL header in accordance with an embodiment of the present invention.

Floor management may be implemented by a Soft Switch, in one embodiment, through the use of the Peer-to-Peer Connection Reference and PTT Priority fields (FIG. 13). The Peer-to-Peer Connection Reference field is used to identify each connection with at least one unique RPDFL identifier that enables a Soft Switch to distinguish between packets arriving via different connections while using a single UDP/IP socket. The Peer-to-Peer Connection Reference field is further ideally based on a source/destination structure as illustrated in FIG. 16. Such a structure enables more efficient packet distribution by a packet-switched apparatus in an interoperability system. In one embodiment, the Peer-to-Peer Connection Reference field may identify a RPDFL Source Address and a RPDFL Destination Address. These addresses may be similar in structure to, for example, IP or UDP source and destination addresses. The PTT priority field enables a priority selection where there are simultaneous attempts by multiple remote packet-switched apparatus to transmit to a shared radio system, for example.

FIGS. 17-23 illustrate examples of the use of the Peer-to-Peer Connection Reference and PTT Priority fields for priority selection, packet distribution and floor management in an interoperability system in accordance with the present invention. For ease of illustration, the interoperability system in each of these figures is a radio sharing system similar to that illustrated in FIG. 4. However, those of ordinary skill in the art will realize that the interoperability system may have any structure enabled in accordance with the present invention.

Figure 17:
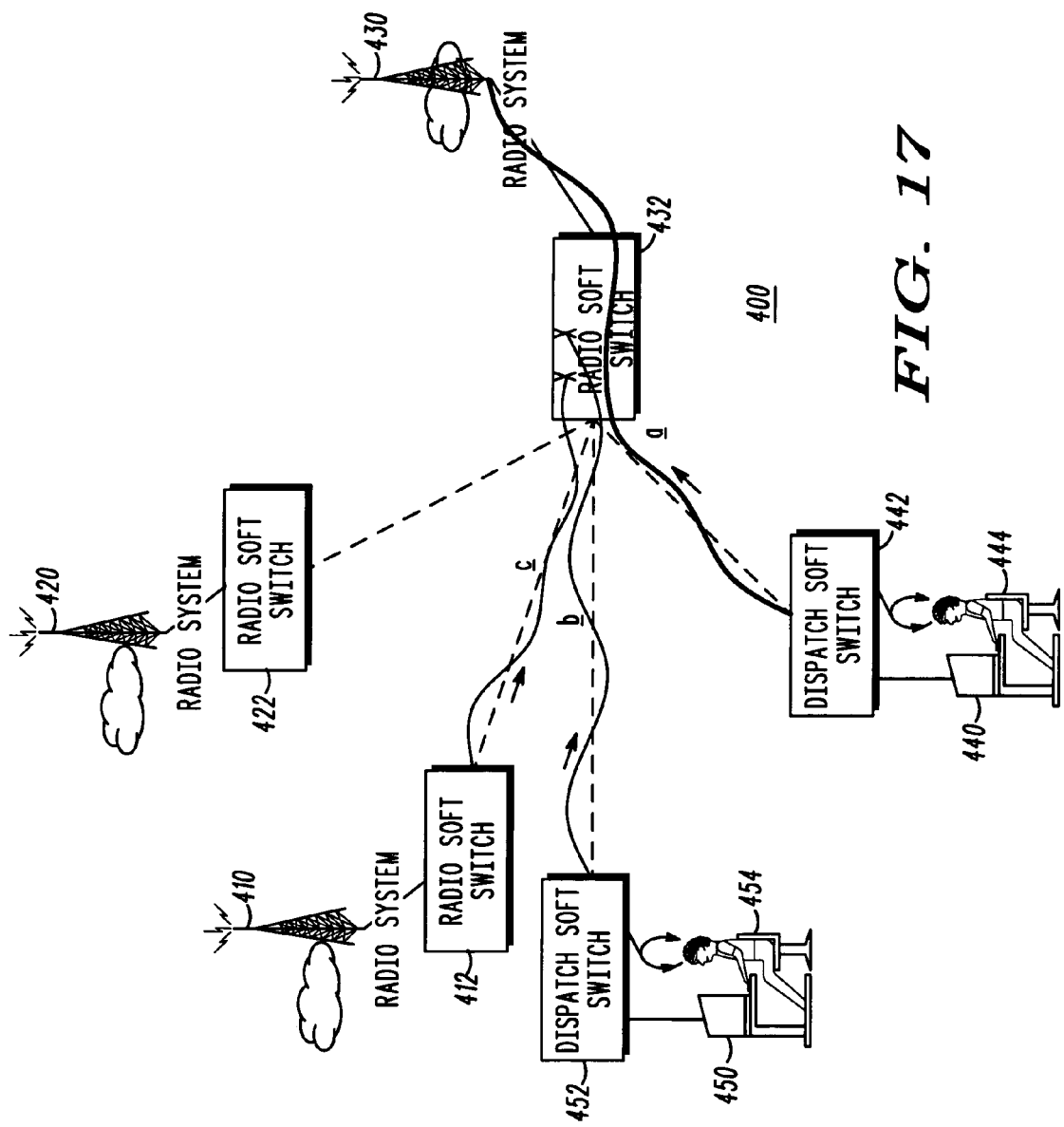
FIG. 17 illustrates floor management using a PTT priority field in an RPDFL header in accordance with an embodiment of the present invention.

FIG. 17 illustrates a radio sharing system 400. Radio sharing system 400 is identical to that illustrated in FIG. 4 and is, therefore, identically labeled. Accordingly, for the sake of brevity the detailed description of each element will not be repeated here. FIG. 17 further illustrates floor management by radio system 430 using the PTT Priority field. In this case, radio system 410 and dispatcher apparatus 440 and 450 are each simultaneously attempting to transmit packets to the shared radio system 430. The PTT Priority field in the RPDFL header of the packets transmitted by radio system Soft Switch 412 to the Radio Soft Switch 432 has a priority value of "c." The PTT Priority field in the RPDFL header of the packets transmitted by dispatcher apparatus Soft Switch 442 to the Radio Soft Switch 432 have a priority value of "a." The PTT Priority field in the RPDFL header of the packets transmitted by dispatcher apparatus Soft Switch 452 to the Radio Soft Switch 432 has a priority value of "b." The PTT priority values may, for example, be set during system deployment and may be modified remotely from the OMC by a privileged interoperability administrator. The PTT priority value may, for instance, range from 0-15, wherein 15 corresponds to the highest priority. Let us assume that the Radio Soft Switch 432 detects that the priority value "a" indicates the highest transmission priority. The Radio Soft Switch 432 would accordingly select the packets from dispatcher apparatus 440 for transmission into radio system 430.

Figure 18:
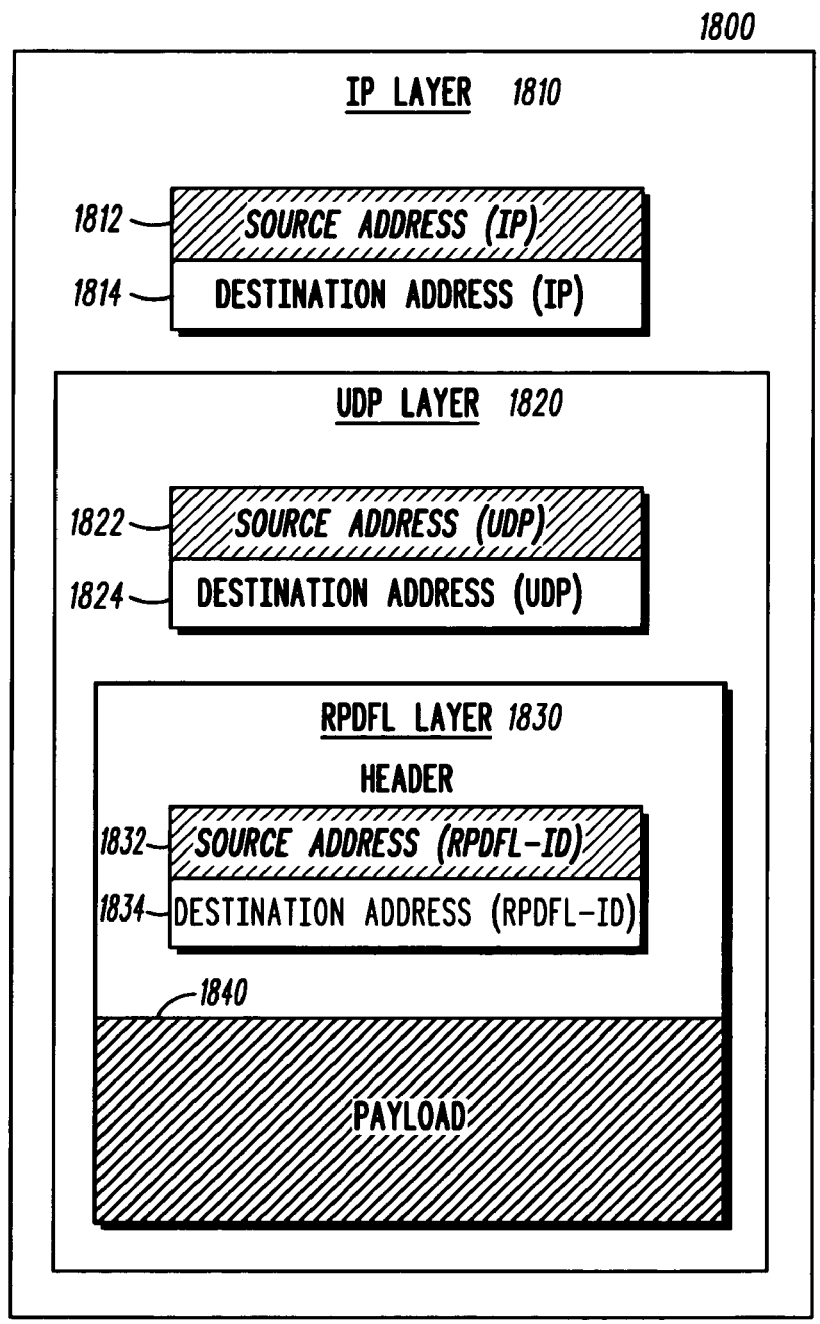
FIG. 18 illustrates packet duplication in accordance with an embodiment of the present invention.

FIG. 18 illustrates an exemplary packet 1800 that may be transmitted over an established RPDFL connection. Packet 1800 has been processed by: the IP Layer (L3) 1810 and has an IP Source Address 1812 and an IP Destination Address 1814; the UDP Layer (L4) 1820 and has a UDP Source Address 1822 and a UDP Destination Address 1824; and the RPDFL Layer (L5) 1830 and has a RPDFL Source Address 1832 and a RPDFL Destination Address 1834. Packet 1800 further has a Payload 1840 that in the following packet duplication examples is audio, but may be any media. As mentioned above, the source/destination structure of the Peer-to-Peer Connection Reference field of the RPDFL header enables efficient media distribution. More specifically, audio for example may be distributed using a packet duplication process, wherein a framed packet is built once and duplicated to multiple connected packet-switched apparatus by simply by replacing the L5, L4 and L3 destinations fields, as illustrated in FIG. 18.

Figure 19:
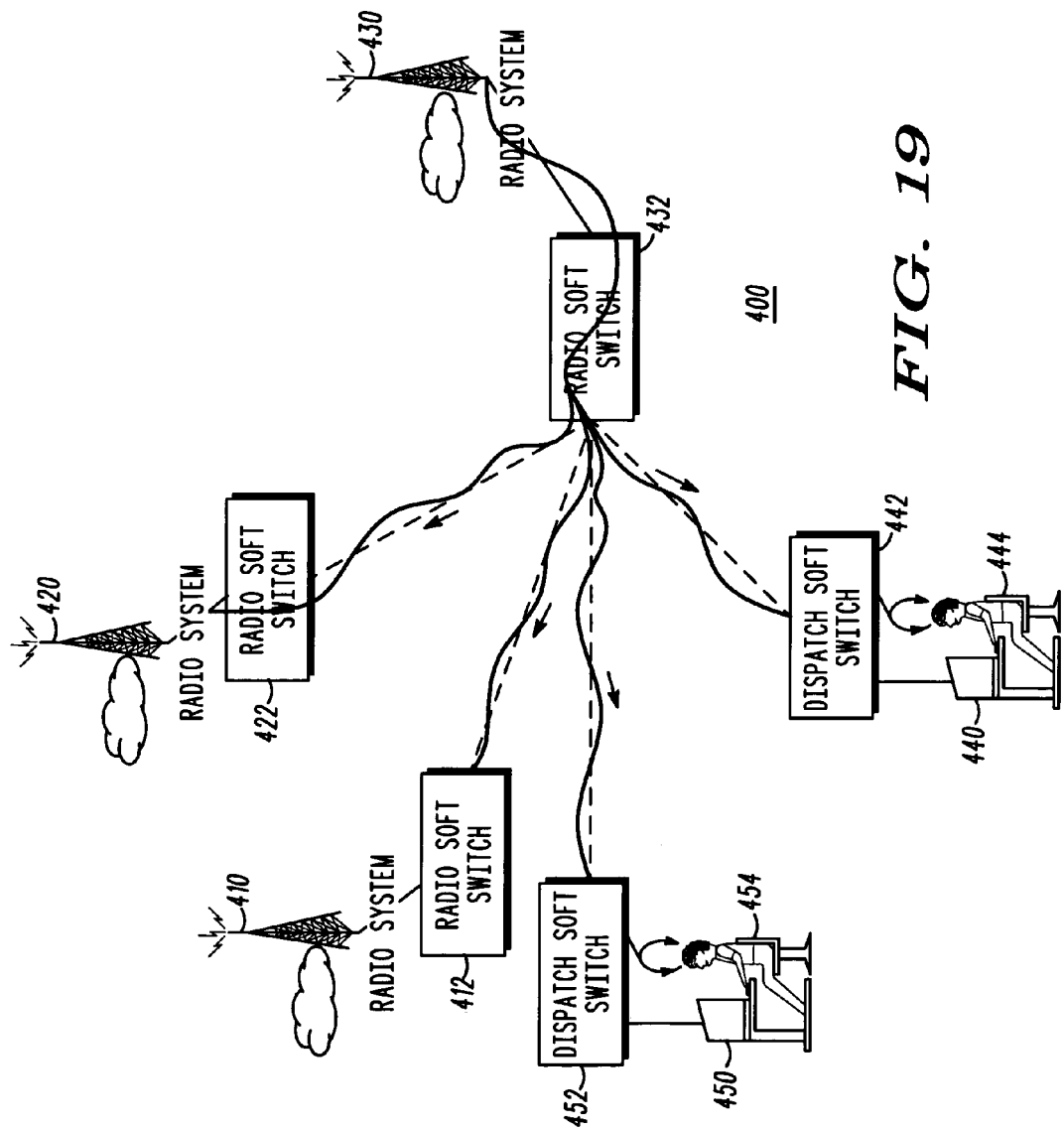
FIG. 19 illustrates receive audio distribution using packet duplication in accordance with an embodiment of the present invention.

FIG. 19 illustrates the duplication and distribution of packets having Rx audio in a radio sharing group 400. Radio sharing group 400 is identical to that illustrated in FIG. 4 and is, therefore, identically labeled. Accordingly, for the sake of brevity the detailed description of each element will not be repeated here. FIG. 19 illustrates packet duplication by the Radio Soft Switch 432 of radio system 430. In FIG. 19, Radio Soft Switch 432 may duplicate packets having audio payload transmitted, for example by a radio in the radio system 430, using packet duplication in accordance with FIG. 18. Radio Soft Switch 432 may then transmit the packets to the Soft Switches of the packet-switched apparatus in the radio sharing group 400 based upon their respective RPDFL destination addresses.

Figure 20:
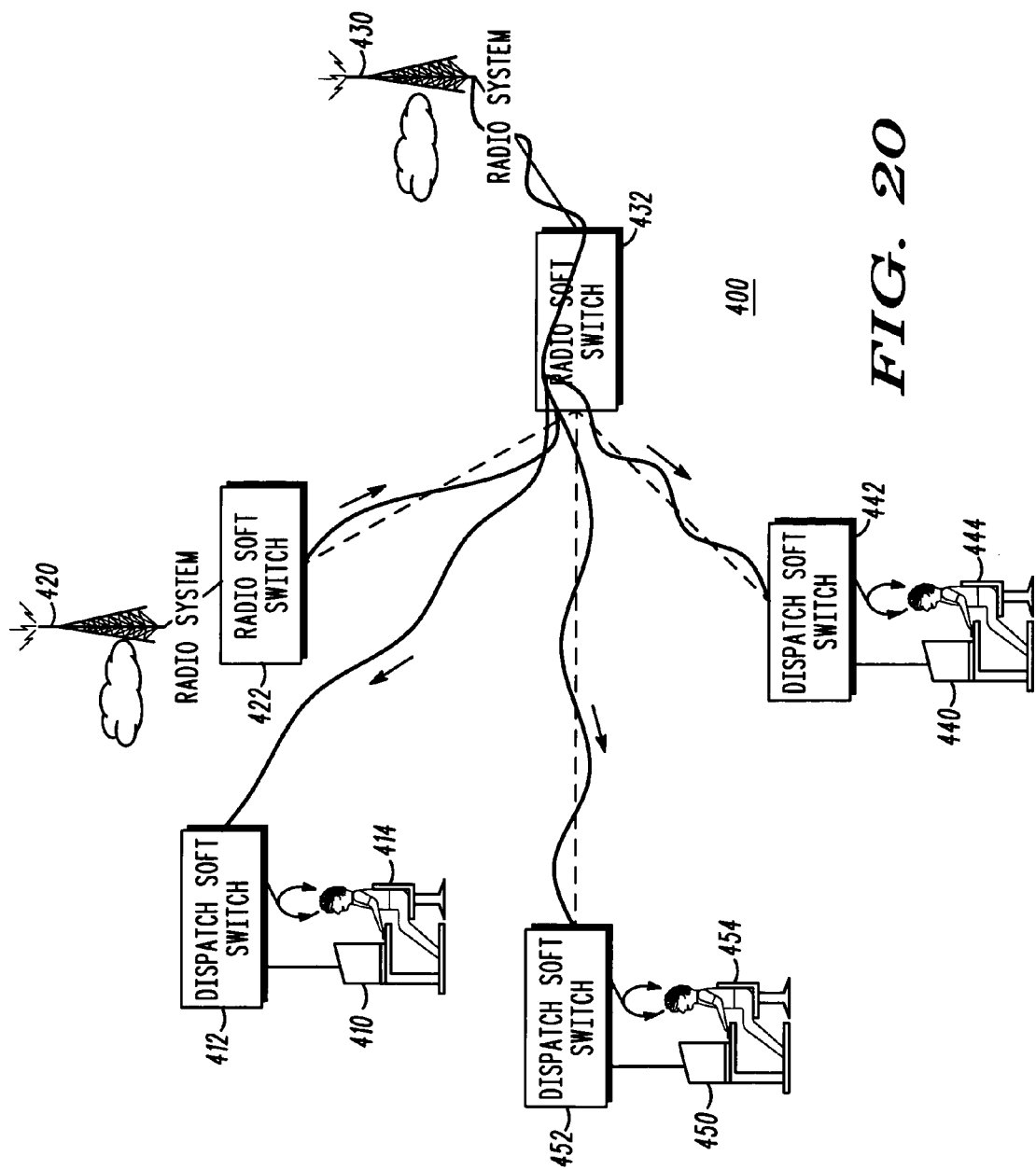
FIG. 20 illustrates transmit-monitoring audio distribution using packet distribution in accordance with an embodiment of the present invention.

FIG. 20 illustrates the duplication and distribution of packets having Tx-monitor audio in a radio sharing group 400. Radio sharing group 400 is nearly identical to that illustrated in FIG. 4 and is, therefore, identically labeled. Accordingly, for the sake of brevity the detailed description of each element will not be repeated here. The only difference between system 400 of FIG. 20 and system 400 of FIG. 4 is that radio system 410 is replaced with dispatcher apparatus 410 having a Dispatcher Soft Switch 412 operated by a dispatcher 414. FIG. 20 further illustrates packet duplication by the Radio Soft Switch 432 of radio system 430. In FIG. 20, Radio Soft Switch 432 may duplicate packets having audio payload transmitted, for example, by a radio in the radio system 420 via its Radio Soft Switch 422, using packet duplication in accordance with FIG. 18. Radio Soft Switch 432 may then transmit the packets to the Dispatcher Soft Switches of the dispatcher apparatus in the radio sharing group 400 based upon their respective RPDFL destination addresses.

An interoperability system in accordance with the present invention may be further structured to enable bandwidth savings, for example in a WAN. In one embodiment, the interoperability network has one or more sub-networks such as, for instance, a PSAP LAN, wherein the network and each sub-network has a packet-switched apparatus responsible for the floor management of the other packet-switched apparatus in the sub-network. This creates a multi-level or multi-stage floor management structure.

Figure 21:
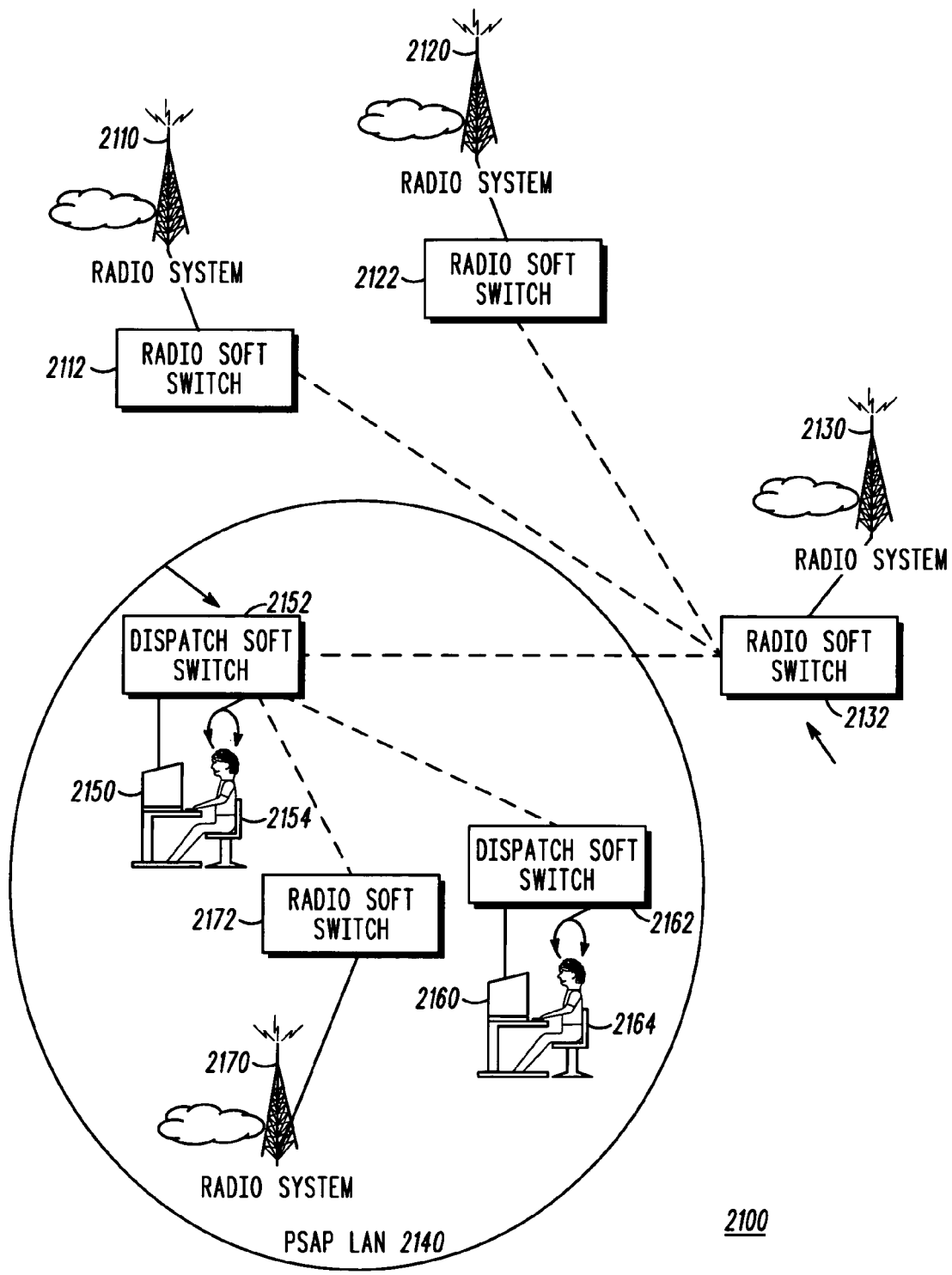
FIG. 21 illustrates WAN bandwidth savings using proxy floor management in accordance with an embodiment of the present invention.

FIG. 21 illustrates such an interoperability network configuration 2100. Network 2100 includes: a radio system 2130 having a Radio Soft Switch 2132 in accordance with the present invention, which may perform floor management for network 2100; a radio system 2110 having a Radio Soft Switch 2112 in accordance with the present invention; a radio system 2120 having a Radio Soft Switch 2122 in accordance with the present invention; and a dispatcher apparatus 2150 having a Dispatcher Soft Switch 2152 in accordance with the present invention that is operated by a dispatcher 2154 and that may be included within and perform floor management for a PSAP LAN 2140. The PSAP LAN is further illustrated as including a radio system 2170 having a Radio Soft Switch 2172 in accordance with the present invention and a dispatcher apparatus 2160 having a Dispatcher Soft Switch 2162 in accordance with the present invention that is operated by a dispatcher 2164. Packet-switched apparatus 2160 and 2170 each have a peer-to-peer RPDFL connection with dispatcher apparatus 2150, wherein the set-up of these connections are ideally established through SIP as described above. Moreover, the OMC may publish each "proxy" Soft Switch (e.g., Soft Switch 2152), i.e., having floor management responsibility for a sub-network, in an updated "interoperability phone book" available to at least a portion of the packet-switched apparatus in the system.

Figure 22:
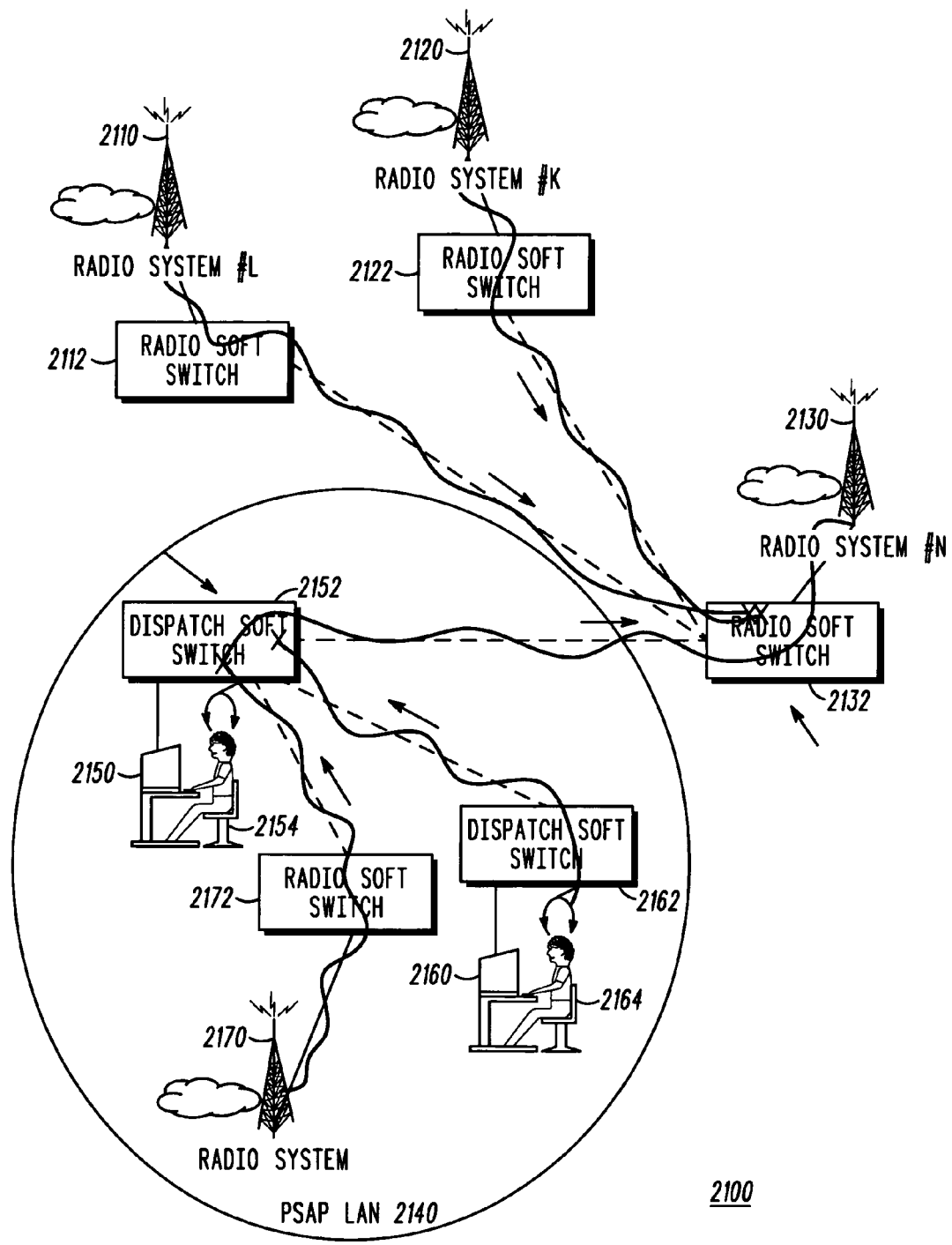
FIG. 22 illustrates WAN bandwidth savings using proxy floor management and priority selection in accordance with an embodiment of the present invention.

FIG. 22 illustrates a priority selection example using the interoperability network structure 2100 of FIG. 21. In this case, radio systems 2110, 2120 and 2170 and dispatcher apparatus 2150 and 2160 are each simultaneously attempting to transmit packets to the shared radio system 2130. The PTT Priority field in the RPDFL header of the packets transmitted by radio system Soft Switch 2112 to the Radio Soft Switch 2132 has a priority value of "d." The PTT Priority field in the RPDFL header of the packets transmitted by Radio Soft Switch 2122 to the Radio Soft Switch 2132 has a priority value of "e." The PTT Priority field in the RPDFL header of the packets transmitted by dispatcher apparatus Soft Switch 2152 to the Radio Soft Switch 2132 has a priority value of "c." The PTT Priority field in the RPDFL header of the packets transmitted by dispatcher apparatus Soft Switch 2162 to the Dispatcher Soft Switch 2152 has a priority value of "b." The PTT Priority field in the RPPDFL header of the packets transmitted by Radio Soft Switch 2172 to the Dispatcher Soft Switch 2152 have a priority value of "a." Accordingly at a first stage or level, Dispatcher Soft Switch 2152 may select priority for transmission between packets from apparatus 2170, 2160 and itself (e.g., packets having priority value "a" are selected as having the highest PTT priority value). At a second level or stage, Radio Soft Switch 2132 may select priority for transmission to radio system 2130 between packets from apparatus 2110, 2120 and 2170 (e.g., packets having priority value "a" are again selected as having the highest PTT priority value).

Figure 23:
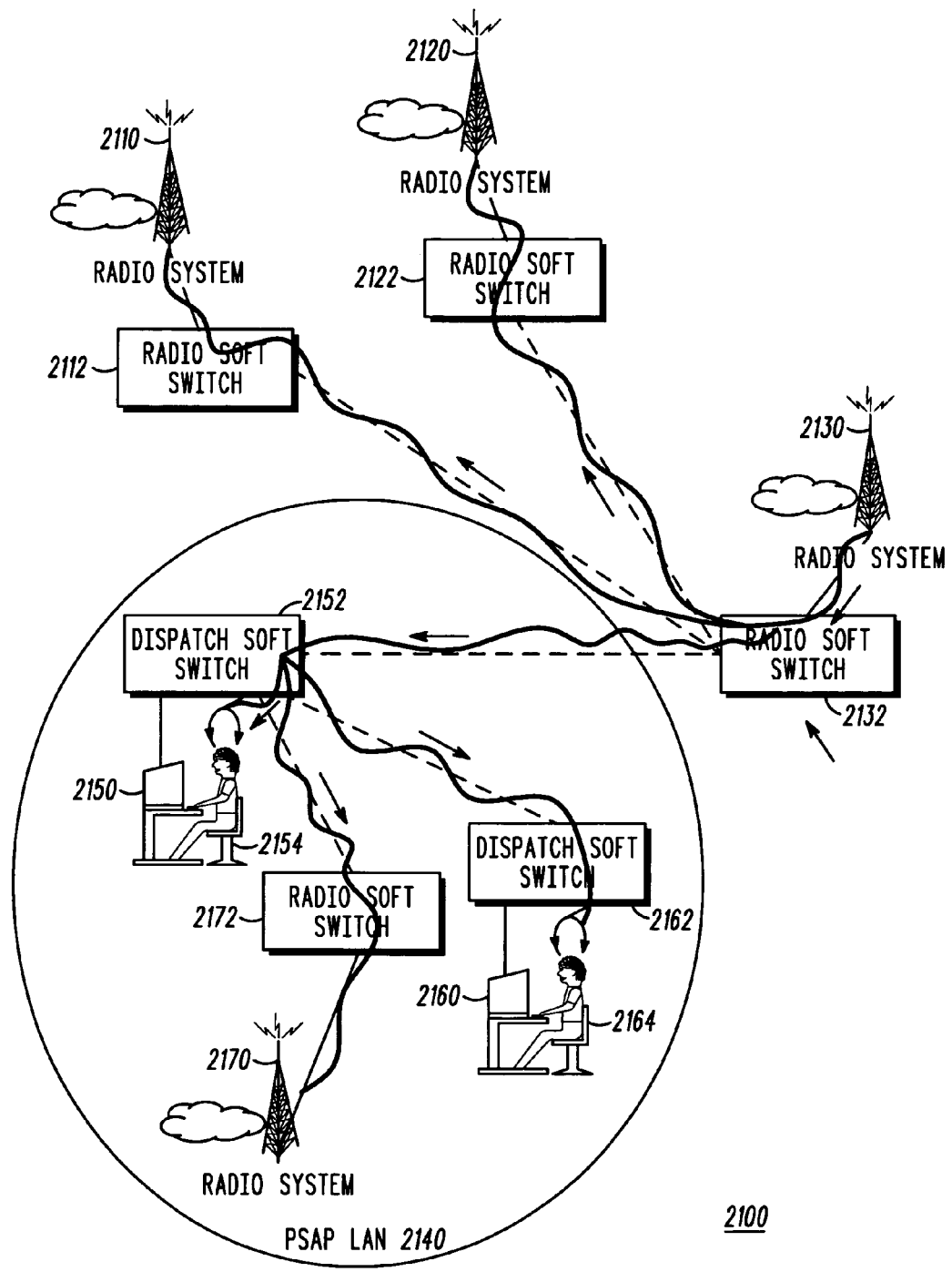
FIG. 23 illustrates WAN bandwidth savings using proxy floor management to distribute receive audio in accordance with an embodiment of the present invention.

FIG. 23 illustrates a Rx audio distribution example using the interoperability network structure 2100 of FIG. 21. In this case, Radio Soft Switch 2132 transmits packets from a radio, for example, in radio system 2130 to Radio Soft Switches 2112 and 2122 and to Dispatch Soft Switch 2152. In turn, Dispatch Soft Switch 2152 transmits the received packets to Radio Soft Switch 2170 and Dispatcher Soft Switch 2162 in the PSAP LAN.

Figure 24:
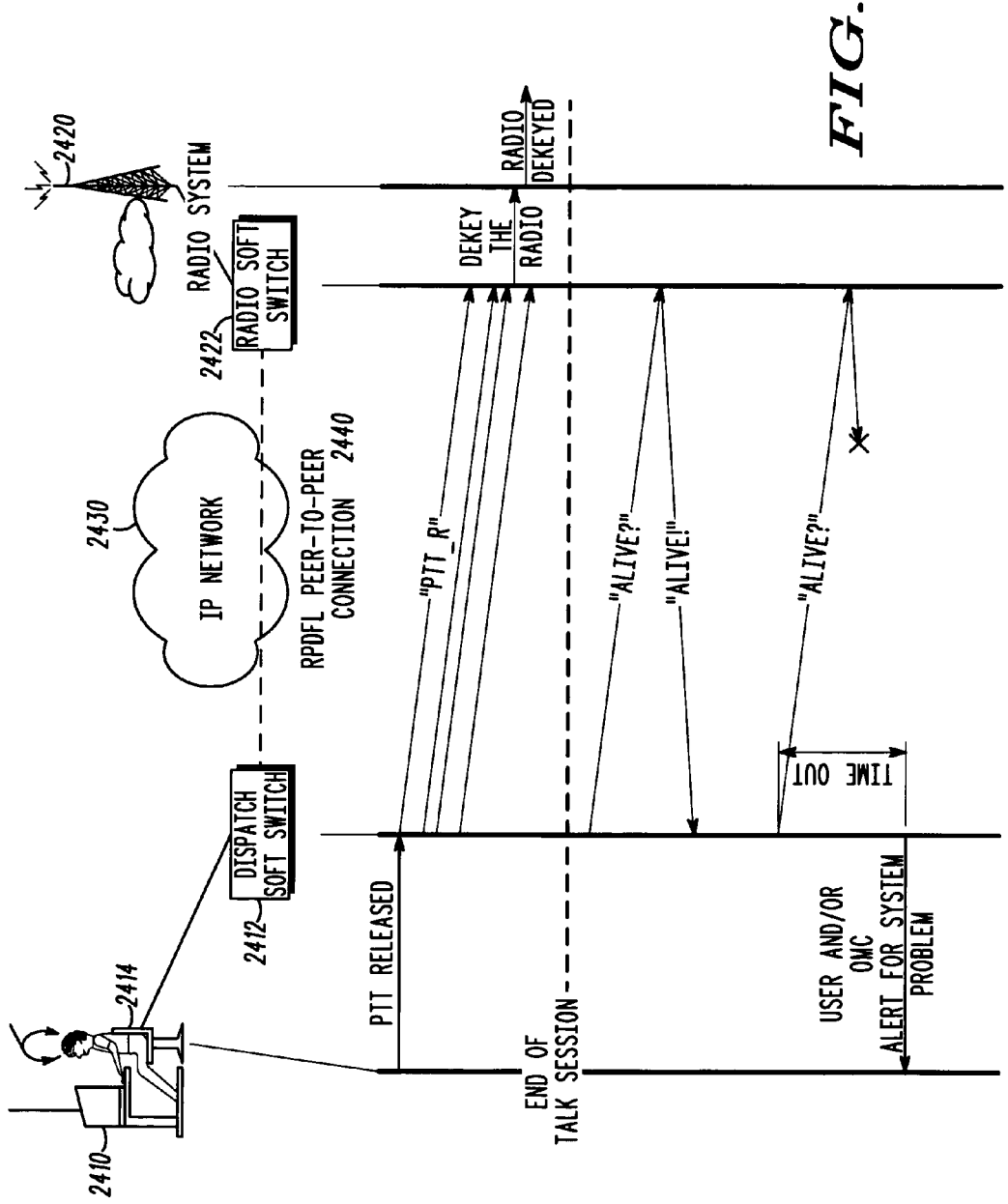
FIG. 24 is a bounce diagram illustrating RPDFL survivability during network failure in accordance with an embodiment of the present invention.

Radio interoperability systems, being mission critical, must be able to survive and recover from IP network failure scenarios. FIG. 24 illustrates a bounce diagram illustrating RPDFL survivability during network failure in accordance with the present invention. FIG. 24 shows a dispatcher apparatus 2410 having a Dispatcher Soft Switch 2412 operated by a dispatcher 2414, which has established a peer-to-peer connection 2440 across an IP network 2430 between the Dispatcher Soft Switch 2412 and a Radio Soft Switch 2422 of a radio system 2420. As illustrated, the dispatcher 2414 has released the PTT button on the dispatcher apparatus (e.g., at the end of a talk session) thereby causing the Dispatcher Soft Switch 2412 to send a plurality of PTT R packets for keying-off radio system 2420 by Radio Soft Switch 2422 upon receipt of one of those packets.

Thereafter, the Dispatcher Soft Switch may periodically, for example every 30 seconds, send "keep alive" framed packets to the Radio Soft Switch 2422 while the radio system 2420 is IDLE to assure the availability of the peer-to-peer connection. Keep alive framed packets are those wherein the coded signal value field in the RPDFL header includes the Is_D_Alive signal to query the Radio Soft Switch 2422 as to whether it is alive. If the Radio Soft Switch fails to respond with, for instance, a packet having D_Is_Alive in the coded signal value field of the RPDFL header within a predetermined amount of time, then the Dispatcher Soft Switch may alarm the dispatcher (or the OMC) of a possible IP transport failure as soon as possible. The dispatcher or the OMC system may then select an alternate and equivalent connection to the radio system.

Figure 25:
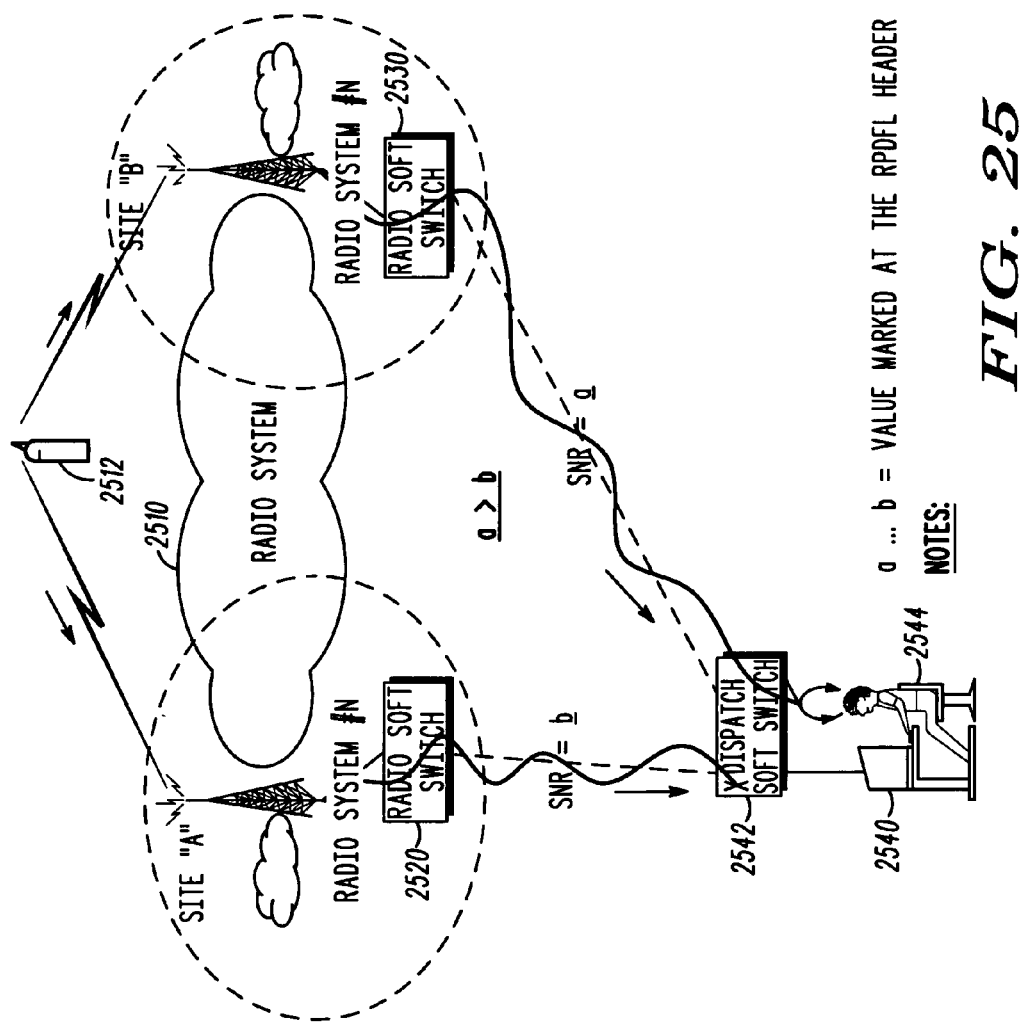
FIG. 25 illustrates RPDFL survivability during a radio system failure in accordance with an embodiment of the present invention.

The Signal to Noise (SNR) field in the RPDFL header allows a dispatcher apparatus 2540 having a Dispatcher Soft Switch 2542 operated by a dispatcher 2544, for example, to be connected to a radio system (e.g., radio system 2510) through two diverse connection or access points, as illustrated in FIG. 25. FIG. 25 illustrates a radio 2512 being capable of communicating with the Dispatcher Soft Switch 2542 via two different connection sites "A" (via Radio Soft Switch 2520) and "B" (via Radio Soft Switch 2530). The SNR field allows automatic diversity selections at the remote sides for survivable operation (or for simulcast operation). The two access points into the radio system are set to the same talk group. The Dispatcher Soft Switch selects the radio path (either "a" or "b") in each voice session (whenever "PTT_P" signal is detected) based on the highest SNR value. Thus, the dispatcher transmits using the latest and strongest receiving path. A fail in the receive path will ideally cause an automatic path change. The SNR value may be estimated using any suitable equipment or algorithm that may be included within or interfaced to the Soft Switch that estimates the SNR value.

Returning once again to FIG. 13, the remaining fields in the RPDFL header may be used as follows. The Frame Number field is a packet counter to allow the operation of a jitter buffer, for instance, at the receive side. The RPDFL Version field indicates the version of the RPDFL protocol, thereby allowing the control of different versions of packet-based apparatus operating in the same interoperability network. For example, if an apparatus running a newer RPDFL version has to interoperate with another apparatus having an older RPDFL version they will typically have to communicate using the older version, etc. The SPARE filed may be used for further implementation and functionality of the present invention.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. For example, although the present invention has been described by reference to peer-to-peer connections, those of ordinary skill in the art will realize that some of the principles of the present invention may also be applied to client-server based solutions. For instance, the RPDFL session layer framing protocol in accordance with an embodiment of the present invention may also be used in client-server based solutions. Thus, it should be understood that the invention is not limited by the foregoing description, but embraces all such alterations, modifications and variations in accordance with the spirit and scope of the appended claims.

What is claimed is:

1. A method for session layer framing for interoperability between packet-switched apparatus, comprising the steps of:
   a processing device performing:
   generating a communication frame at the session layer comprising a plurality of fields;
   providing for a payload field in the plurality of fields for carrying a payload; and
   providing for a signal field in the plurality of fields for carrying a control signal;
   providing for a Coded Signal Value" field in the plurality of fields to carry control signaling;
   providing for a "Peer-to-Peer Connection Reference" field in the plurality of fields for identifying connections;
   providing for a "Frame Number" field;
   providing for a "RPDFL Version Number" field in the plurality of fields for indicating a version of an RPDFL protocol
   providing for a "PTT Priority" field in the plurality of fields for enabling a priority selection;
   providing for an "SNR" field ideally in the plurality of fields for allowing automatic diversity selections;
   providing for a "Spare" field ideally in the plurality of fields; and
   wherein the frame enables peer-to-peer communication between a first packet-switched apparatus in a first communication system and a second packet-switched apparatus in a second disparate communication system.

2. The method of claim 1 further comprising identifying a radio control signal in the signal field.

3. The method of claim 2, wherein the radio control signal indicates a request by a first packet-switched apparatus to communicate with a second packet-switched apparatus, the method further comprising the step of transmitting a communication frame to the second packet-switched apparatus a predetermined number of times for causing the second packet-switched apparatus to be keyed-on.

4. The method of claim 3, wherein each communication frame is directly transmitted to the second packet-switched apparatus.

5. The method of claim 3, wherein the radio control signal indicates that the payload field contains media payload, the method further comprising the step of placing media payload into the payload field and transmitting a communication frame with the media payload subsequent to transmitting the predetermined number of frames having the radio control signal indicating the request to communicate.

6. The method of claim 3 further comprising detecting that a PTT indication is active and as a result of the detection transmitting the predetermined number of frames having the radio control signal indicating the request to communicate.

7. The method of claim 2, wherein the radio control signal indicates a request by a first packet-switched apparatus to terminate communication with a second packet-switched apparatus, the method further comprising the step of transmitting the communication frame to the second packet-switched apparatus a predetermined number of times for causing the second packet-switched apparatus to be keyed-off.

8. The method of claim 1 further comprising the step of providing for a connection reference field for identifying at least two packet-switched apparatus participants for a given communication session.

9. The method of claim 8, wherein the connection reference field identifies at least one source participant and at least one destination participant.

10. The method of claim 8 further comprising the steps of:
    for a group of destination participants,
    duplicating a communication frame;
    identifying a destination participant from the group in the connection reference field; and
    transmitting the duplicated communication frame to the identified destination participant.

11. The method of claim 10, wherein the communication frame is received from a source participant.

12. The method of claim 10, wherein the communication frame is transmitted by a first packet-switched apparatus to a second packet-switched apparatus and the second packet-switched apparatus performs the steps of duplicating the communication frame, identifying the destination participant and transmitting the communication frame to the identified destination participant.

13. The method of claim 1 further comprising the step of providing for a priority field for enabling a selection to be made of a first packet-switched apparatus to transmit in a group of packet-switched apparatus each simultaneously requesting to transmit.

14. The method of claim 13, wherein the selection is made by at least two packet-switched apparatus.

15. The method of claim 2, wherein the radio control signal is used to query a packet-switched apparatus to determine if the packet-switched apparatus is alive, the method further comprising the steps of transmitting the communication frame to the packet-switched apparatus and waiting for a response to the query.

16. The method of claim 15, wherein an action is taken if the response is not received from the packet-switched apparatus within a predetermined time period.

17. The method of claim 1 further comprising the step of providing for a Signal-to-Noise (SNR) field for enabling a selection of a communication path to be made from a group of communications paths, wherein each path in the group is coupled to a packet-switched apparatus.

18. The method of claim 17, wherein the selection is made based upon at least one criterion that is indicated in the SNR field.

19. The method of claim 18, wherein the at least one criterion includes path strength.

20. A packet-switched apparatus comprising:
a processing device for executing processing steps; and
a storage device coupled to the processing device for storing a set of process steps executable by the processing device, the process steps comprising:
generating a communication frame at the session layer comprising a plurality of fields;
providing for a payload field in the plurality of fields for carrying a payload;
providing for a Coded Signal Value" field in the plurality of fields to carry control signaling;
providing for a "Peer-to-Peer Connection Reference" field in the plurality of fields for identifying connections;
providing for a "Frame Number" field;
providing for a "RPDFL Version Number" field in the plurality of fields for indicating a version of an RPDFL protocol
providing for a "PTT Priority" field in the plurality of fields for enabling a priority selection;
providing for an "SNR" field ideally in the plurality of fields for allowing automatic diversity selections;
providing fora "Spare" field ideally in the plurality of fields; and
providing for a signal field in the plurality of fields for carrying a control signal, wherein the frame enables peer-to-peer communication between the packet-switched apparatus in a first communication system and a second packet-switched apparatus in a second disparate communication system.

* * * * *

UNITED STATES PATENT AND TRADEMARK OFFICE
CERTIFICATE OF CORRECTION

PATENT NO. : 8,249,102 B2
APPLICATION NO. : 10/899714
DATED : August 21, 2012
INVENTOR(S) : Koren et al.

Page 1 of 1

It is certified that error appears in the above-identified patent and that said Letters Patent is hereby corrected as shown below:

In Column 17, Line 66, in Claim 1, delete "Coded" and insert -- "Coded --, therefor.

In Column 18, Line 6, in Claim 1, delete "protocol" and insert -- protocol; --, therefor.

In Column 19, Line 22, in Claim 17, delete "Signal-to-Noise" and insert -- Signal-to-Noise Ratio --, therefor.

In Column 20, Line 10, in Claim 20, delete "Coded" and insert -- "Coded --, therefor.

In Column 20, Line 17, in Claim 20, delete "protocol" and insert -- protocol; --, therefor.

In Column 20, Line 22, in Claim 20, delete "fora" and insert -- for a --, therefor.

Signed and Sealed this
Fifth Day of February, 2013

Teresa Stanek Rea
*Acting Director of the United States Patent and Trademark Office*